United States Patent
Boeder et al.

(10) Patent No.: US 11,308,552 B1
(45) Date of Patent: Apr. 19, 2022

(54) DEVICE-TO-DEVICE MICROLENDING WITHIN A DISTRIBUTED SYSTEM

(71) Applicant: Wells Fargo Bank, N.A., San Francisco, CA (US)

(72) Inventors: Joel Eric Boeder, Maple Grove, MN (US); Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Cape Coral, FL (US); Makarand Shivadevuni, San Ramon, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 69 days.

(21) Appl. No.: 16/723,181

(22) Filed: Dec. 20, 2019

(51) Int. Cl.
G06Q 40/02 (2012.01)
G06Q 20/40 (2012.01)
G06Q 20/36 (2012.01)

(52) U.S. Cl.
CPC ....... *G06Q 40/025* (2013.01); *G06Q 20/3672* (2013.01); *G06Q 20/405* (2013.01)

(58) Field of Classification Search
None
See application file for complete search history.

(56) References Cited

U.S. PATENT DOCUMENTS

| 8,655,762 B2 | 2/2014 | Abifaker |
| 10,038,700 B1 | 7/2018 | Duchin et al. |

(Continued)

FOREIGN PATENT DOCUMENTS

| CN | 109191275 A | 1/2019 |
| CN | 109472596 | 3/2019 |

(Continued)

OTHER PUBLICATIONS

M. Tian, L. Wang, S. Yan, X. Tian, Z. Liu and J. J. P. C. Rodrigues, "Research on Financial Technology Innovation and Application Based on 5G Network," in IEEE Access, vol. 7, pp. 138614-138623, Aug. 2019, doi: 10.1109/ACCESS.2019.2936860. (Year: 2019).*

(Continued)

*Primary Examiner* — Gregory S Cunningham, II
(74) *Attorney, Agent, or Firm* — Shumaker & Sieffert, P.A.

(57) ABSTRACT

A distributed system includes a user device that is configured to identify a service provided by a service device; determine a specific amount of funds associated with the service; send, to a lending device, a real-time loan request associated with a loan, where the real-time loan request specifies at least an identifier of the user device and the specific amount of funds for the loan; receive, from the lending device, a digital token that specifies usage restrictions that are associated with (i) an approved amount of funds, (ii) a duration of the loan, and (iii) a payee associated with the service device; and send, to the service device, a real-time transaction request for the service provided by the service device, where the real-time transaction request includes the digital token that is redeemable by the payee associated with the service device for the approved amount of funds for the loan.

19 Claims, 7 Drawing Sheets

(56) References Cited

U.S. PATENT DOCUMENTS

| | | | |
|---|---|---|---|
| 10,237,290 | B2 | 3/2019 | Balakrishnan et al. |
| 10,326,766 | B2 | 6/2019 | Egner et al. |
| 10,338,913 | B2 | 7/2019 | Franchitti |
| 10,524,268 | B2* | 12/2019 | Ogrinz ............... H04W 72/0493 |
| 2006/0224502 | A1 | 10/2006 | McGowan |
| 2008/0052224 | A1 | 2/2008 | Parker |
| 2008/0103970 | A1 | 5/2008 | Books et al. |
| 2008/0156868 | A1 | 7/2008 | Slen et al. |
| 2009/0076972 | A1 | 3/2009 | Witchel et al. |
| 2009/0287605 | A1 | 11/2009 | Galit et al. |
| 2010/0057609 | A1 | 3/2010 | Sibson |
| 2011/0178899 | A1 | 7/2011 | Huszar |
| 2012/0265681 | A1* | 10/2012 | Ross ..................... G06Q 40/02 705/44 |
| 2013/0117174 | A1 | 5/2013 | Cole et al. |
| 2013/0218675 | A1 | 8/2013 | Choi |
| 2014/0067650 | A1 | 3/2014 | Gardiner et al. |
| 2014/0074701 | A1 | 3/2014 | Kingston et al. |
| 2014/0122340 | A1 | 5/2014 | Flitcroff et al. |
| 2015/0066739 | A1 | 3/2015 | Lucas, Jr. et al. |
| 2015/0310470 | A1* | 10/2015 | Mathew ............. G06Q 30/0215 705/14.17 |
| 2016/0267584 | A1 | 9/2016 | Nair |
| 2017/0061535 | A1 | 3/2017 | Williams |
| 2018/0039970 | A1 | 2/2018 | Gorenstein |
| 2019/0020657 | A1 | 1/2019 | Egner et al. |
| 2019/0026716 | A1* | 1/2019 | Anbukkarasu ....... G06Q 20/389 |
| 2019/0034924 | A1 | 1/2019 | Prabhu et al. |
| 2019/0081789 | A1 | 3/2019 | Madisetti et al. |
| 2019/0295064 | A1* | 9/2019 | Malo ................. G06Q 20/3224 |
| 2020/0184555 | A1 | 6/2020 | Gleizer |

FOREIGN PATENT DOCUMENTS

| | | |
|---|---|---|
| CN | 109492774 | 3/2019 |
| KR | 101995871 B1 | 9/2014 |
| KR | 10-1802771 B1 | 11/2017 |

OTHER PUBLICATIONS

Office Action from U.S. Appl. No. 16/723,283, dated Jan. 25, 2021, 18 pp.

Response to Office Action dated Jan. 25, 2021, from U.S. Appl. No. 16/723,283, filed Feb. 8, 2021, 11 pp.

Rajasingham, "Welcome to the machine-to-machine economy," CAN, accessed from https://www.commbank.com.au/guidance/newsroom/corporate-travel1-201711.html, published online Nov. 28, 2017, 8 pp.

Lane et al., "Lowering Financial Inclusion Barriers With a Blockchain-Based Capital Transfer System," Whitepaper Version 1.1, 2017, 28 pp. (Applicant points out, in accordance with MPEP 609.04(a), that the year of publication, 2017, is sufficiently earlier than the effective U.S. filing date, so that the particular month of publication is not in issue.).

Ruiz, "How to add Support for gift cards on your Ethereum-based dapps," Dec. 28, 2017, 1 pp.

Shala et al., "Novel trust consensus protocol and blockchain-based trust evaluation system for M2M application services," Internet of Things 7 (2019), Elsevier, accepted May 10, 2019, 25 pp.

Srinidhi et al., "Network optimizations in the Internet of Things: A review," International Journal of Engineering Science and Technology 22 (2019), Elsevier, accepted Sep. 9, 2018, 21 pp.

Strugar et al., "An architecture for distributed ledger-based M2M auditing for Electric Autonomous Vehicles," Workshops of the International Conference on Advanced Information Networking and Applications, Mar. 15, 2019, accessed from SpringLink, arXiv:1804.00658v2, 12 pp.

Yang et al., "New Loan System Based on Smart Contract," ACM International Symposium on Blockchain and Secure Critical Infastructure (BSCI '19), Jul. 8, 2019, 6 pp.

U.S. Appl. No. 16/723,067, filed Dec. 20, 2019, naming inventors Kalaboukis et al.

U.S. Appl. No. 16/723,283, filed Dec. 20, 2019, naming inventors Boeder et al.

Office Action from U.S. Appl. No. 16/723,067, dated Aug. 16, 2021, 16 pp.

Notice of Allowance from U.S. Appl. No. 16/723,283, dated Jun. 1, 2021, 8 pages.

* cited by examiner

DEVICE-TO-DEVICE MICROLENDING WITHIN A DISTRIBUTED SYSTEM

TECHNICAL FIELD

The present disclosure relates to distributed computing systems.

BACKGROUND

In many instances, devices or machines may interact with each other within a distributed system. For example, a first device associated with a user may be configured to engage in a transaction with a second device to purchase a product or service (e.g., a physical or virtual product or service). In these cases, the first device may often be required to provide some form of payment to the second device prior to obtaining this product or service.

SUMMARY

In general, this disclosure describes techniques for device-to-device (e.g., machine-to-machine) microlending within a distributed system. The distributed system may include one or more lending devices, one or more service devices, one or more user devices, and, in some cases, a central trusted authority system. For example, a service machine may provide a service for a specific amount of funds. A user device may be configured to automatically request a microloan from a lending machine within the distributed system for the specific amount of funds in order to obtain the service provided by the service machine. In certain cases, the user device may request the microloan in response to identifying a shortfall between a device-managed budget and a periodic expense. After receiving the request from the user device, the lending machine may generate a token that is redeemable by a payee of the service device for the specific amount of funds within a specified time period. In some cases, the lending machine may send the token to the user device, which may then provide the token to the service machine in order to obtain the requested service. In other cases, the lending machine may send the token directly to the service device.

As one example, this disclosure is directed to a method that includes identifying, by a user device, a service that is provided by a service device, determining, by the user device, a specific amount of funds that are associated with the service, and sending, by the user device and to a lending device, a real-time loan request associated with a loan, wherein the real-time loan request specifies at least an identifier of the user device and the specific amount of funds for the loan. The example method includes, after sending the real-time loan request, receiving, by the user device and from the lending device, a digital token associated with the loan, wherein the digital token specifies usage restrictions that are associated with (i) an approved amount of funds for the loan, (ii) a duration of the loan, and (iii) a payee associated with the service device, and sending, by the user device and to the service device, a real-time transaction request for the service provided by the service device, wherein the real-time transaction request includes the digital token associated with the loan, and wherein the digital token is redeemable by the payee associated with the service device for the approved amount of funds for the loan.

As another example, this disclosure is directed to a user device that includes one or more processors and a computer-readable storage device. The computer-readable storage device stores instructions that are executed by the one or more processors to: identify a service that is provided by a service device; determine a specific amount of funds that are associated with the service; send, to a lending device, a real-time loan request associated with a loan, wherein the real-time loan request specifies at least an identifier of the user device and the specific amount of funds for the loan; after sending the real-time loan request, receive, from the lending device, a digital token associated with the loan, wherein the digital token specifies usage restrictions that are associated with (i) an approved amount of funds for the loan, (ii) a duration of the loan, and (iii) a payee associated with the service device; and send, to the service device, a real-time transaction request for the service provided by the service device, wherein the real-time transaction request includes the digital token associated with the loan, and wherein the digital token is redeemable by the payee associated with the service device for the approved amount of funds for the loan.

As another example, this disclosure is directed to a computer-readable storage device storing instructions that, when executed, cause one or more processors of a user device to: identify a service that is provided by a service device; determine a specific amount of funds that are associated with the service; send, to a lending device, a real-time loan request associated with a loan, wherein the real-time loan request specifies at least an identifier of the user device and the specific amount of funds for the loan; after sending the real-time loan request, receive, from the lending device, a digital token associated with the loan, wherein the digital token specifies usage restrictions that are associated with (i) an approved amount of funds for the loan, (ii) a duration of the loan, and (iii) a payee associated with the service device; and send, to the service device, a real-time transaction request for the service provided by the service device, wherein the real-time transaction request includes the digital token associated with the loan, and wherein the digital token is redeemable by the payee associated with the service device for the approved amount of funds for the loan.

As another example, this disclosure is directed to a method that includes receiving, by a lending device and from a user device, a real-time request for a loan, wherein the loan is associated with a service provided by a service device, and wherein the real-time request specifies at least an identifier of the user device and a specific amount of funds for the loan, determining, by the lending device, based at least on the specific amount of funds for the loan and on the identifier of the user device, whether to provide the loan to the user device, and, responsive to determining to provide the loan to the user device, generating, by the lending device, a digital token associated with the loan, wherein the digital token specifies usage restrictions that are associated with (i) an approved amount of funds, (ii) a duration of the loan, and (iii) a payee associated with the service device. The example method further includes sending, by the lending device and to at least one of the user device or the service device, the digital token associated with the loan, wherein the digital token is redeemable by the payee associated with the service device for the approved amount of funds for the loan.

As another example, this disclosure is directed to a lending device that includes one or more processors and a computer-readable storage device. The computer-readable storage device stores instructions that are executed by the one or more processors to: receive, from a user device, a real-time request for a loan, wherein the loan is associated with a service provided by a service device, and wherein the real-time request specifies at least and an identifier of the user device and a specific amount of funds for the loan; determine, based at least on the specific amount of funds for the loan and on the identifier of the user device, whether to provide the loan to the user device; responsive to determining to provide the loan to the user device, generate a digital token associated with the loan, wherein the digital token specifies usage restrictions that are associated with (i) an approved amount of funds, (ii) a duration of the loan, and (iii) a payee associated with the service device; and send, to at least one of the user device or the service device, the digital token associated with the loan, wherein the digital token is redeemable by the payee associated with the service device for the approved amount of funds for the loan.

As another example, this disclosure is directed to a computer-readable storage device storing instructions that, when executed, cause one or more processors of a lending device to: receive, from a user device, a real-time request for a loan, wherein the loan is associated with a service provided by a service device, and wherein the real-time request specifies at least an identifier of the user device and a specific amount of funds for the loan; determine, based at least on the specific amount of funds for the loan and on the identifier of the user device, whether to provide the loan to the user device; responsive to determining to provide the loan to the user device, generate a digital token associated with the loan, wherein the digital token specifies usage restrictions that are associated with (i) an approved amount of funds, (ii) a duration of the loan, and (iii) a payee associated with the service device; and send, to at least one of the user device or the service device, the digital token associated with the loan, wherein the digital token is redeemable by the payee associated with the service device for the approved amount of funds for the loan.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
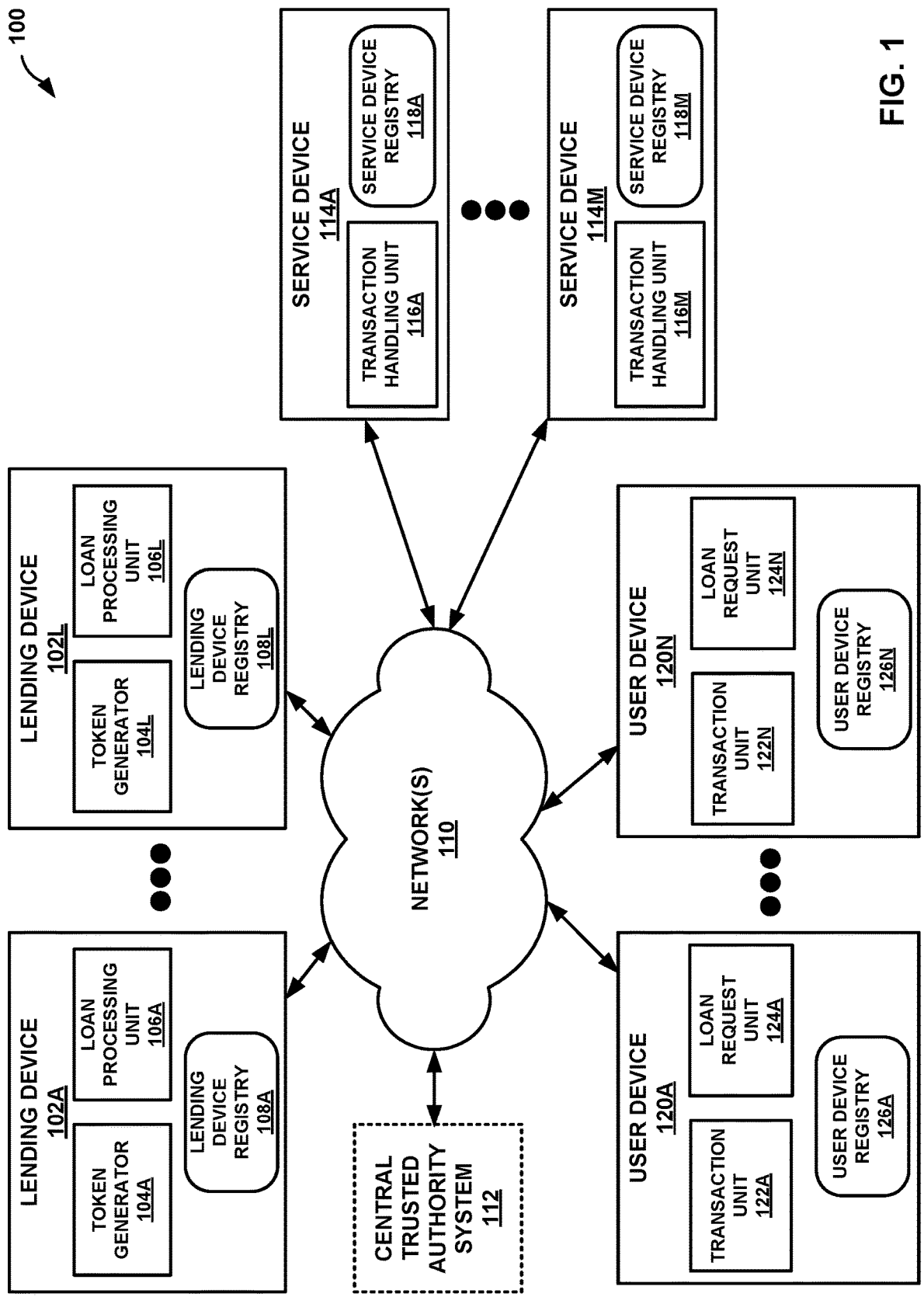
FIG. 1 is a block diagram illustrating an example distributed lending system that is configured to process real-time loan requests from user devices, in accordance with techniques of this disclosure.

In general, this disclosure describes techniques for device-to-device microlending within a distributed system. The distributed system may include one or more lending devices, one or more services devices, one or more user devices, and, in some cases, a central trusted authority system. For example, a user device may be configured to automatically request a microloan from a lending device within the distributed system for a specific amount of funds in order to obtain a service provided by the service device. After receiving the request from the user device, the lending device may generate a token that is redeemable for an approved amount (e.g., an amount equal to the specific amount of funds requested by the user device) within a specific time period. In some cases, the lending device may send the token to the user device, which may then provide the token to the service device in order to obtain the requested service. In other cases, the lending device may send the token directly to the service device.

In certain cases, the user device may request a microloan in response to identifying a shortfall between a device-managed budget and a periodic expense. For example, in certain device-to-device transactions, a first device may recognize that it will exceed its budget and, in response, request assistance from a lending device to provide the anticipated shortfall in the form of a microloan. The lending device may provide the loan to the first device in the form of a token and/or smart contract with restrictions on how the token or smart contract may be redeemed. The smart contract and its terms/restrictions are represented by the token.

As one example, for machines or smart devices, such as Internet-of-Things devices within a household network, it may be beneficial to track actual machine usage cost over a period of time (e.g., daily, weekly, monthly) to enable granular budgeting of the overall household expenses. For instance, each machine within the household network may track its energy usage cost based on the cost per unit of energy provided by a service machine associated with a relevant utility company. Such individualized tracking enables granular budgeting and may help users understand the impact of the usage of individual machines (e.g., the cost equivalent of lowering the temperature by 2 degrees). Granular budgeting may include providing each machine with its own budget to manage. In some examples, however, a budget shortfall anticipated or calculated by a machine may be unavoidable where continued usage is non-discretionary (e.g., in the case of heat or water). In those examples, the machine may select from among several options to resolve the anticipated shortfall, including autonomously (e.g., without human intervention) requesting a microloan from a lending machine at, e.g., an associated financial institution, in order to cover the projected budget shortfall. In various examples, a user machine may perform one or more transactions with another machine (e.g., requesting a loan from a lending machine) without human intervention.

In various examples, a device (e.g., machine) may comprise a physical entity (e.g., a computing device, a computer server, a quantum computer, a desktop computer, a tablet computer, a laptop computer, any mechanical device with computing engine such as a self-driving automobile, drone, parking meter, highway toll, sensor with computing engine such as Internet of Things, smartphone, etc.) and/or virtual entity (e.g., virtual machine, application software in a computing machine, cloud computing system, etc.). In certain examples, a device (e.g., machine) may include one or more computers that process information, sensors that monitor performance and movement, and/or devices with embedded computers such as smartphones, television sets, radios, wireless headsets, digital cameras, global positioning system (GPS) based navigators, automated teller machines, drones, traffic lights, battery chargers, parking meters, and so on. Some devices conduct a single function and others carry out multiple functions.

FIG. 1 is a block diagram illustrating an example distributed lending system 100 that is configured to process real-time loan requests received from user devices, in accordance with techniques of this disclosure. As shown in FIG. 1, distributed lending system 100 includes one or more user devices 120A-120N (collectively, "user devices 120"), one or more lending devices 102A-102L (collectively, "lending devices 102"), and one or more service devices 114A-114M (collectively, "service devices 114"). One or more of lending devices 102 may be part of or otherwise associated with one or more financial institutions. In some cases, one or more of lending devices 102 may also comprise a service device, such as one of service devices 114, and vice versa.

In some cases, distributed system 100 may also include an optional central trusted authority system 112. User devices 120, lending devices 102, service devices 114, and central trusted authority system 112 may be interconnected via one or more networks 110. Networks 110 may comprise one or more wired and/or wireless communication networks, such that user devices 120, lending devices 102, service devices 114, and central trusted authority system 112 may communicate with one another via one or more wired and/or wireless connections. User devices 120, lending devices 102, service devices 114, and/or central trusted authority system 112 may be physically located at one geographical location or may be distributed among different geographical locations.

As will be described in further detail below, in various examples, a user device, such as user device 120A, may identify a service that is provided by a service device, such as service device 114A. The user device may determine a specific amount of funds that are associated with the service, and may send a real-time loan request associated with a loan to a lending device, such as lending device 102A. The real-time loan request specifies at least an identifier of the user device and the specific amount of funds for the loan. In some cases, the loan request may also specify or include service information indicating the purpose of the loan or information about the desired service, and it may also specify an identifier associated with the service device that provides the desired service.

After sending the real-time loan request, the user device may receive, from the lending device, a digital token associated with the loan. The digital token may specify usage restrictions that are associated with (i) an approved amount of funds for the loan, (ii) a duration of the loan, and (iii) a payee associated with the service device. After receiving the digital token, the user device may send, to the service device, a real-time transaction request for the service provided by the service device. The real-time transaction request includes the digital token associated with the loan that, where the digital token is redeemable by the payee associated with service device, and from a payor (e.g., financial institution) associated with the lending device, for the specific amount of funds for the loan. In some alternate examples, the lending device may send the digital token directly to the service device, which again is redeemable by the payee for the approved amount of funds for the loan associated with the service. The service device may then provide the requested service to the user device.

Figure 3:
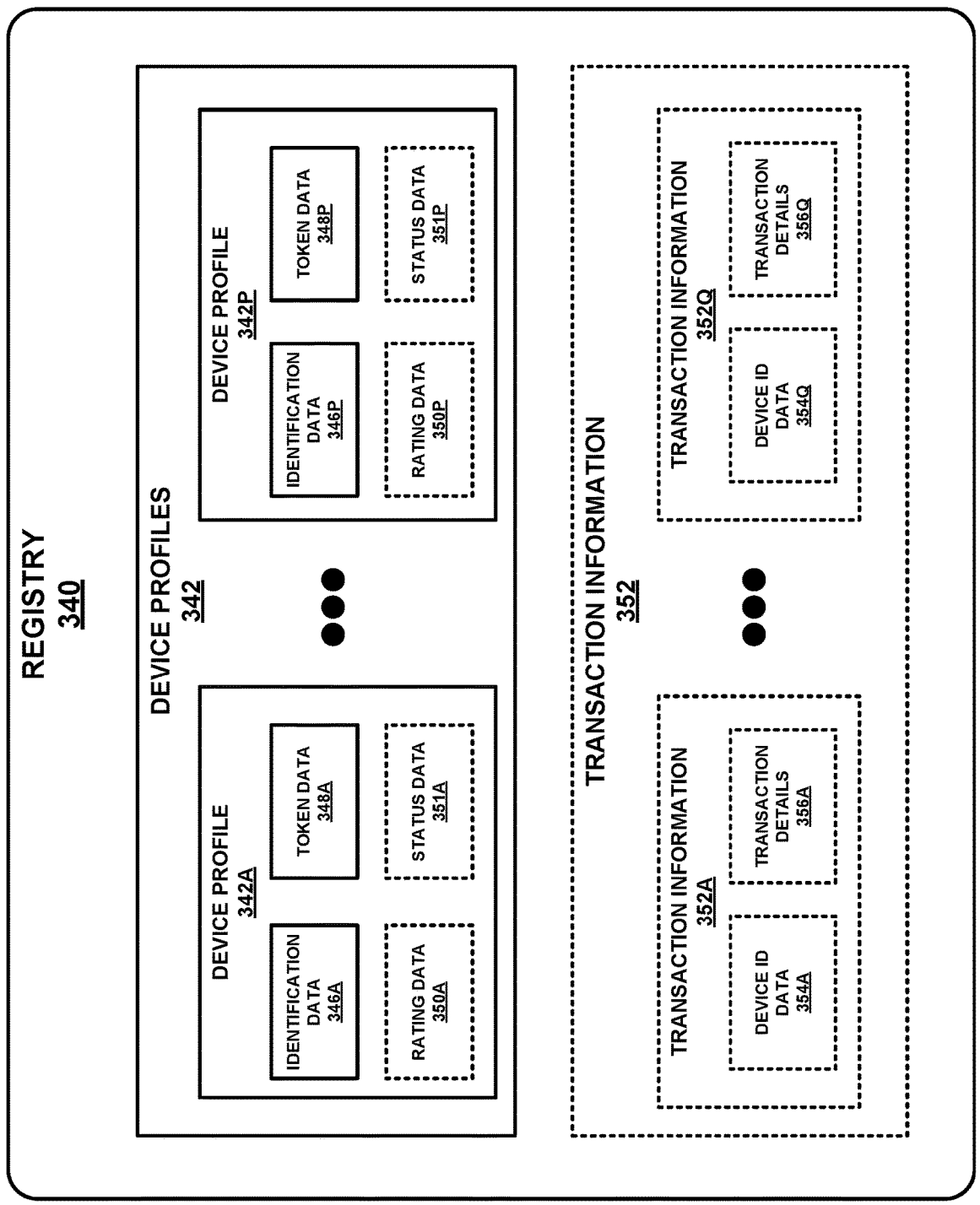
FIG. 3 is a block diagram illustrating further example details of a registry, such as one or more of the registries shown in FIG. 1 and/or FIG. 2, in accordance with techniques of this disclosure.

When distributed system 100 includes optional central authority system 112, central authority system 102 may be configured to receive and process queries that are received from any of devices 120, 102, and/or 114, and may also be configured to process transaction information based on transactions than occur within system 100. Central authority system 112 may also include a central registry having device profiles and transaction information, such as shown in FIG. 3. Transaction information may include information associated with transactions that are or have been performed within system 100, such as between devices 120, 102, 114, and/or with central authority system 112. This information may include specific information for each individual transaction, such as the type of transaction, metadata associated with the transaction, and any identifiers (e.g., machine identifiers) of devices that were involved in the respective transaction. This transaction information may be populated and updated based upon information collected and/or provided by central authority system 112, which is capable of monitoring transactions that occur within system 100. In certain cases, central authority system 112 is configured to populate and update the transaction information based upon direct involvement of central authority system 112 in certain transactions, and central authority system 112 may be configured to populate and update the transaction information based upon transaction data it receives from one or more of devices 120, 114, and/or 102.

Device profiles stored by central authority system 112 may include information for each device in system 100. Each individual device profile within these device profiles may include information associated with a respective device. For instance, each device profile may include identification data (e.g., a unique identifier), capability data, and/or rating data for each respective device, such as shown in FIG. 3. In the case of a physical device, the unique identifier for the device may, in some cases, be the device's Internet Protocol (IP) or media access control (MAC) address. In the case of a virtual device (e.g., virtual machine), the unique identifier may be an identifier associated with or assigned by the physical device on which the virtual device is executed. In some examples, the identifiers of all the devices, whether physical or virtual, are assigned by central authority system 112, which may ensure that all currently active devices have a unique identifier. In addition, central authority system 112 may periodically refresh the identifiers to remove identifiers of devices that are no longer available and assign new identifiers to newly available machines. In this way, central authority system 112, as opposed to individual devices with system 100, manages the identification of any virtual devices (e.g., virtual machines), which may be torn down and re-instantiated over time.

Each of user devices 120 includes a transaction unit, a loan request unit, and a local registry. For instance, as shown in FIG. 1, user device 120A includes a transaction unit 122A, a loan request unit 124A, and a user device registry 126A. Similarly, user device 120N includes a transaction unit 122N, a loan request unit 124N, and a user device registry 126N, which perform similar functions to the corresponding entities of user device 120A.

Transaction unit 122A of user device 120A is configured to initiate and/or otherwise process transactions between user device 120A and one or more other entities, such as with lending devices 102, service devices 114, and/or central authority system 112 via networks 110. In some cases, transaction unit 122A is configured to send queries to central authority system 102 and receive identifications of other devices in system 100 with which to perform a transaction.

Transaction unit 122A of user device 120A may be configured to identify one or more services that are provided by service devices 114. For instance, transaction unit 122A may identify a particular service that is provided by service device 114A (e.g., service to sell a physical or electronic ticket, service to sell a physical or virtual product). Transaction unit 122A may determine a specific amount of funds (e.g., physical or virtual/digital currency) associated with the desired service. Loan request unit 124A of user device 120A may then be configured to send one or more real-time loan requests associated with a loan to one or more of lending devices 102. For instance, loan request unit 124A may send such a real-time loan request to lending device 102A, where the real-time loan request specifies the specific amount of funds for the loan. This loan request may also include the identifier associated with user device 120A. In some cases, the loan may comprise a microloan (e.g., a loan for a small amount of funds and/or for a small period of time).

In certain cases, loan request unit 124A may send a real-time loan request in response an identified shortfall of funds between a device-managed budget of user device 120A and an (e.g., periodic) expense, where the requested loan is for the specific amount of funds for a specific time period. As one example, user device 120A (e.g., an appliance, car) may have a budget for a periodic expense (e.g., utility bill, groceries, tolls). User device 120A may track its actual usage over that period, e.g., a month, and determine whether a shortfall is expected for that month. When a shortfall is detected, user device 120A determines the specific shortfall amount for a specific time period (e.g., the last week of the month). User device 120A then uses loan request unit 124A to send a loan request to loan processing unit 106A lending device 102A to request a loan for the specific shortfall amount having a duration of the specific time period. In these cases, loan request unit 124A may supply loan processing unit 106A (e.g., within the loan request) with the specific shortfall amount for the loan, the specific time period or duration for which the loan is needed, the purpose of the loan, and/or identifying information of the service device or associated payee (e.g., the utility, grocery supplier, or toll company).

As will be described in further detail below, in some examples, loan request unit 124A may interact with central authority system 112 to identify which one or more of lending devices 102 it will send the request. For example, central authority system 112 may utilize a rating system that is configured to provide rating information for lending devices 102, which may be used by user device 120A in determining which of lending devices 102 it will send the request.

In some examples, a service device may comprise or function as a lending device. In some examples, service devices 114 may identify and/or recommend one or more approved, or preferred, lending devices to user devices 120 for one or more services that are desired or requested by user devices 120. For example, user device 120A may send a request or query to service device 114A for the identifiers of one or more approved or preferred lending devices that are associated with a requested service. Based on certain factors (e.g., the identifier of user device 120A, the type of requested service, the association or affiliation of one or more of lending devices 102 with service device 114A), service device 114A may determine the identifiers of one or more of lending devices 102 that service device 114A approves or prefers for the requested service. The use of the one or more identified lending devices 102 may streamline the lending process by increasing the possibility, or even ensure, that service device 114A will accept the tokens that are generated by the one or more identified lending devices for the requested services. As one example, a user of user device 120A may pulls into a toll booth, and a determination is made that user device 120A needs a loan to pay the toll booth, which may be part of or otherwise associated with service device 114A. Service device 114A then, either directly or indirectly (e.g., via central trusted authority system 112) provides an identifier of one or more approved or preferred lending devices 102 from which it prefers to receive tokens.

Lending device 102A may receive a real-time loan request from user device 120A. For example, each of lending devices 102 may include a loan processing unit to process such requests. Lending device 102 includes such a loan processing unit 106A, and also includes a token generator 104A and a lending device registry 108A. Similarly, lending device 102L includes loan processing unit 106L, token generator 104L, and lending device registry 108L. Lending device 102A may use its loan processing unit 106A to receive the real-time loan request sent from loan request unit 124A of user device 120A. In some cases, the loan request may not only specify the amount of requested funds and the identifier of user device 120A, but it may also specify the purpose of the loan or information about the desired service, as well as an identifier associated with the service device that provides the desired service.

Upon receiving the request, loan processing unit 106A determines, based on the specific amount of requested funds for the loan, and also based on the identifier of user device 120A, whether or not to provide the loan to user device 120A. As will be described in further detail below, in some examples, lending device 102A may also interact with central authority system 112 to obtain rating and/or credit score information associated with user device 120A. Loan processing unit 106A may utilize such information in determining whether or not to provide a loan to user device 120A. Loan processing unit 106A may also access its own lending device registry 108A to obtain information that it uses in determining whether or not to provide the loan. For example, lending device registry 108A may include credit score information that is associated with user devices 120, as described in more detail below.

In some examples, a user device's credit score, such as the credit score of user device 120A, may be based on a credit score associated with a current owner of user device 120A or a current owner of a bank account tied to user device 120A. In other examples, user device 120A may have its own bank account and credit score that are not associated with any human. In the case where the loan is a microloan (e.g., a small amount for a specific purpose over a short time period), and user device 120A has a good credit score, lending device 102A may approve the requested loan with a relatively low interest rate. In some cases, lending device 102 may approve a loan amount that is less than the requested amount from user device 120A. In these cases, user device 120A may request one or more additional loans from one or more other lending devices 102L to obtain the desired, cumulative amount of funds for obtaining one or more services from service devices 114.

Responsive to determining that it will provide a loan to user device 120A, loan processing unit 106A may request its token generator 104A to generate a smart contract and/or a digital token that is associated with the loan. In one of more examples, a digital token may be a secure data representation of a live or real data element. In these examples, the digital token may be created by a token generator (e.g., token generator 104A, token generator 104L) through a tokenization process (e.g., using random number generation). The digital token may later be detokenized (e.g., by service devices 114) to reverse the digital token and recover the live or real data element.

In some instances, a token generated by token generator 104A may represent or otherwise be associated with a digital "smart" contract. The digital token and/or smart contract specifies usage restrictions that may be associated with the specific amount of requested funds for the loan, a duration of the loan period, and a payee associated with a service device that provides the desired service, to ensure that the token is used in accordance with the usage restrictions. In some cases, the digital token and/or smart contract may also specify an interest rate for the loan, as determined by loan processing unit 106A (e.g., based on the amount of the loan, the duration of the loan, the identity of user device 120A). Token generator 104A may store the generated tokens and/or smart contracts within its lending device registry 108A. Upon generation of the digital token by token generator 104A, loan processing units 106A may send the token to one or more of user device 120A and/or the service device that provides the desired service, such as service device 114A. The digital token is redeemable by a payee (e.g., financial institution) associated with service device 114A, and from a payor (e.g., financial institution) associated with the lending device 102A, for the specific amount of funds of the desired service. In some cases, service device 114A may comprise the payee.

In certain examples, loan processing unit 106A sends the digital token to loan request unit 124A of user device 120A. Loan request unit 124A and/or transaction unit 122A may also store the digital token in its user device registry 126A. In these examples, after loan request unit 124A receives the digital token from loan processing unit 106A of lending device 102A, transaction unit 122A may send a real-time transaction request to service device 114A. The real-time transaction request includes the digital token, which is redeemable by the payee associated with service device 114A for the approved amount of funds associated with the desired service. Transaction handling unit 116A of service device 114A may process the real-time transaction request for the service that is to be provided by service device 114A to user device 120A. Service device 114A may store the digital token in its service device registry 118A.

In certain other examples, rather than sending the digital token to user device 120A, loan processing unit 106A sends the digital token directly to service 114A, which is redeemable by the payee associated with service device 114A for the approved amount of funds associated with the desired service. Service device 114A may store the digital token in its service device registry 118A.

In some examples, upon receipt of a digital token from lending device 102A and/or user device 120A, service device 114A may be configured to validate the token and/or the lending device (e.g., lending device 102A) that generated the token. In these examples, the digital token may specify an identifier of lending device 102A. Service device 102A may validate the token directly with lending device 102A or with a third-party authentication service (e.g., service provided by central authority system 112). In some examples, the token may be validated through use of a digital signature, and the token validation may occur in real-time or near real-time.

In some cases, the restrictions on the digital token may be fixed such that the token may only be redeemed for the specific amount within the specific time period and by the specific payee/service device. In other cases, the restrictions on the token may be modifiable as directed by the specific payee. For example, the token may be generated as, or represent, a smart contract between user device 120A, lending device 102A, and service device 114A. Once the token is transmitted to service device 114A identified in the smart contract, the restrictions included in the original smart contract are fulfilled and the token becomes transferrable by service device 114A. In this way, instead of immediately redeeming the token for the specific amount from a financial institution, the payee associated with service device 114A may retain the token for later use. Service device 114A may request modification of the terms of the smart contract or token by lending device 102A, as described further in reference to FIG. 2, to allow the token to be transferrable to another party within another time period. In some examples, lending device 102A may pay interest on the token during the time the payee holds the token.

In some examples, one or more elements of any given transaction, including digital tokens used in such a transaction, may be stored or otherwise included in one or more blockchain ledgers within system 100. In these examples, portions of a blockchain may be distributed and stored throughout system 100, including on local registries of the devices included in system 100 (e.g., lending device registries 108, service device registries 118, user device registries 126).

Figure 2:
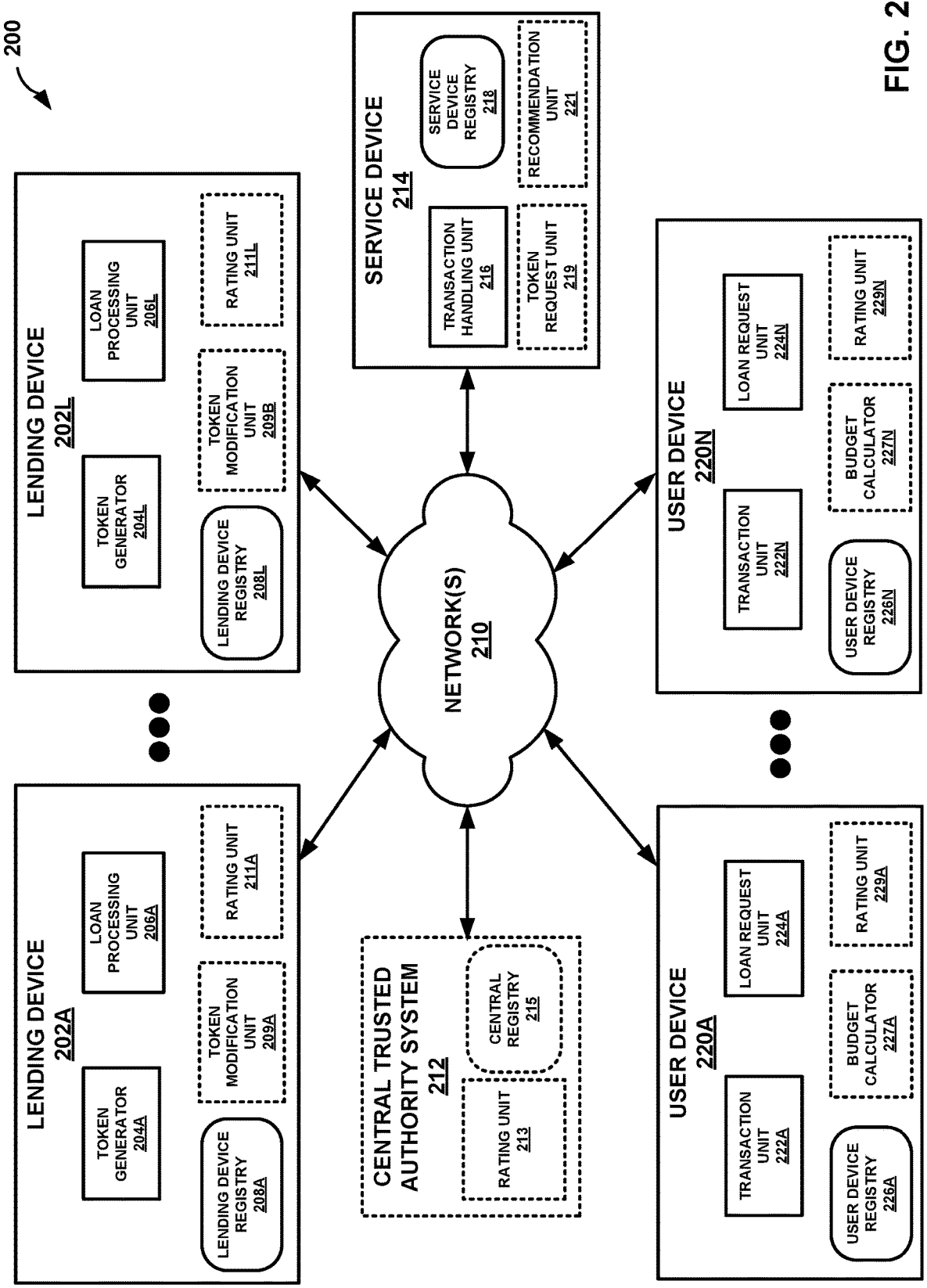
FIG. 2 is a block diagram illustrating further example details of distributed lending system shown in FIG. 1, in accordance with techniques of this disclosure.

FIG. 2 is a block diagram illustrating further example details of a distributed lending system 100, in accordance with techniques of this disclosure. FIG. 2 illustrates a distributed lending system 200, which may be one example of distributed lending system 100. Distributed lending system 200 includes one or more user devices 220A-220N (collectively, "user devices 220"), a service device 214, one or more lending devices 202A-202L (collectively, "lending devices 202"), and an optional central trusted authority system 212, which may be communicatively coupled with each other via one or more networks 210. User devices 220 may be one example of user devices 120 (FIG. 1); networks 210 may be one example of networks 110; service device 214 may be one example of one or more of service devices 114; lending devices 202 may be one example of lending devices 102; and central authority system 212 may be one example of central authority system 112.

Each of user devices 220 includes a transaction unit, a loan request unit, a user device registry, an optional budget calculator, and an optional rating unit. For example, user device 220A includes transaction unit 222A, loan request unit 224A, user device registry 226A, budget calculator 227A, and rating unit 229A. Transaction unit 222A, loan request unit 224A, and user device registry 226A may be similar in function to transaction unit 122A, loan request unit 124A, and user device registry 126A of user device 120A (FIG. 1). Optional budget calculator 227A of user device 220A shown in FIG. 2 may be configured to monitor a budget in view of periodic expenses that are associated with user device 220A or a user/owner of user device 220A.

As one example, for certain machines or smart devices, such as Internet-of-Things devices within a household network, it may be beneficial for budget calculator 227A to track actual machine usage cost over a period of time (e.g., daily, weekly, monthly) to enable granular budgeting of the overall household. For instance, user device 220A may be part of or communicatively coupled to a household network and may use budget calculator 227A to track its energy usage cost based on the cost per unit of energy provided by a service device, such as service device 214, which is associated with a relevant utility company. Such individualized tracking enables granular budgeting and may help users of user device 220A understand the impact of the usage of individual machines (e.g., the cost equivalent of lowering the temperature by 2 degrees). In some examples, however, a budget shortfall anticipated or calculated by budget calculator 227A may be unavoidable where continued usage is non-discretionary (e.g., in the case of heat or water). In those examples, user device 220A may select from among several options to resolve the anticipated shortfall, including the use of loan request unit 224A to autonomously (e.g., without user intervention) request a loan from a lending machine at, e.g., an associated financial institution (e.g., lending device 202A) to cover the projected budget shortfall. The budget shortfall may relate to any form of periodic expense (e.g., utility bill, groceries, tolls). Budget calculator 227A may track actual usage over any period of time (e.g., day, week, month), and determine whether a shortfall is expected for that time period. In various examples, user device 220A may perform one or more transactions with another machine (e.g., requesting a loan from lending device 202A) without human intervention.

Thus, in such a circumstance, budget calculator 227A may calculate the specific shortfall amount for a specific time period (e.g., the last week on a month). Based on the projected shortfall determined by budget calculator 227A, loan request unit 224A may send a real-time loan request to lending device 202A to request a loan for the specific shortfall amount having a duration of the specific time period. In these cases, loan request unit 224A of user device 220A may supply loan processing unit 206A of lending device 202A with the loan request that identifies the specific shortfall as the requested loan amount, the specific time period or duration for which the loan is needed, the purpose of the loan, and/or identifying information of the service device or associated payee (e.g., the utility, grocery supplier, or toll company).

In some cases, loan processing unit 206A may determine an approved amount of funds for the loan that is less than the specific amount requested by loan request unit 224A. In these cases, loan request unit 224A may determine, as a remaining amount of funds, the difference between the specific amount of funds specified in the real-time loan request from loan request unit 224A and the approved amount of funds by loan processing unit 206A. Loan request unit 224A may then second one or more additional real-time loan requests to one or more additional ones of lending devices 202 to requests at least one loan for the remaining amount of funds. One or more of the other lending devices 202 may (e.g., using their respective loan processing unit 206) approve the loan request for the remaining funds, and may provide any corresponding one or more digital tokens back to loan request unit 224A or directly to service device 214, where these tokens specify corresponding usage restrictions associated with the amount of approved funds for corresponding loans, the loan duration(s), and/or payee. Transaction unit 222A may send any received tokens, via one or more transaction requests, to transaction handling unit 216 of service device 214.

As another non-limiting example, user device 220A may comprise a device included in or otherwise associated with an automobile (e.g., a mobile computing device, an infotainment head unit, a wearable device). The user of the automobile may drive into a toll station or booth during travel. The toll station may require payment of ten dollars. In this case, the toll station may include or otherwise be associated with service device 214 (e.g., a computing device included in or part of the toll station). Loan request unit 224A may send a loan request to lending device 202A to request a loan in the amount of ten dollars. Lending device 202A may be affiliated with a financial institution (e.g., an external server or computing system associated with the financial institution), or, in some cases, may be directly associated with service device 214.

Upon checking the rating, as discussed in further detail below, and/or checking the credit score of user device 220A, loan processing unit 206A may only approve a loan amount of five dollars. In this case, token generator 204A may generate a digital token that specifies an approved amount of five dollars and a payee associated with the toll station.

User device 220A may then use its loan request unit 224A to send one or more additional loan requests to other ones of lending devices 202 to obtain the additional five dollars in funds. For example, as described in further detail below, rating unit 229A of user device 220A may obtain rating information for one or more of lending devices 202. Based on the rating information, rating unit 229A may select other lending devices (e.g., in a ranked-based order) for additional loan requests. As one example, loan request unit 224A may send another loan request to loan processing unit 206L of lending device 202L, to request a loan amount of five dollars. If loan processing unit 206L approves the full request amount of five dollars, it may send a corresponding digital token, generated by token generator 204L, to user device 220A or directly to service device 214 associated with the toll booth. Loan request unit 224A may continue with this process of requesting loans until it has obtained the requisite, cumulative amount of ten dollars for toll booth payment. Service device 214 may then redeem the collective set of received digital tokens that are associated with the requested service.

User device 220A also includes an optional rating unit 229A. Rating unit 229A may communicate with rating units of other devices or systems shown in FIG. 2 (e.g., with rating unit 229N of user device 220N, rating unit 213 of central authority system 212, rating unit 211A of lending device 202A, and/or rating unit 211L of lending device 202L). Rating unit 229A may receive real-time rating information from one or more of these other devices or systems within system 200 for use in determining which one or more of lending devices 202 to send loan requests. For example, if loan request unit 224A determines to request a loan of any sort associated with a specific amount of funds associated with a service, with or without using budget calculator 227A, loan request unit 224A may first attempt to identify which one or more of lending devices 202 to which it will send the loan request.

For instance, loan request unit 224A may determine to send the real-time loan request to a lending device associated with a financial institution that is of a threshold size, has a threshold reputation or trustworthiness, provides a threshold level of service or interest rates, and the like. To make such a determination, user device 220A may use rating unit 229A to obtain rating information associated with one or more of lending devices 202. In some cases, rating unit 229A may send rating requests associated with one or more of lending devices 202 to other user devices that have previously interacted with these lending devices. For instance, if user device 220N has previously interacted with lending device 202A, rating unit 229N of user device 220N may provide such rating information to rating unit 229A. Rating unit 229A may also receive rating information from rating unit 213 of central authority system 212. Based on the received rating information, rating unit 229A and/or loan request unit 224A may identify one or more of lending devices 202 to which loan request unit 224A will send a loan request.

In certain cases, user device 220A may attempt to identify other ones of user device 220 that have previously interacted with one or more particular lending devices, such as lending device 202A. In these cases, rating unit 229A may send a query to rating unit 213 of central authority system 212. Rating unit 213 of central authority system 212 may be configured to provide real-time rating information associated with lending device 202A to rating unit 229A, such as by providing rating information that is stored in its central registry 215. Rating unit 213 may also, however, be able to identify other user devices 220 that have previously interacted with (e.g., obtained loans from) lending device 202A, and may provide the identifiers of these candidate devices to rating unit 229A. Rating unit 229A may then use the identifiers of these other user devices (e.g., user device 220N), received from central authority system 212, to send rating requests to these devices and obtain real-time rating information about lending device 202A.

In some cases, user device 220A may also request the identifiers of any candidate lending devices 202 to which it may send loan requests. In these cases, rating unit 229A may send a request for candidate lending devices to rating unit 213 of central authority system 212. The request may include one or more criteria or desired characteristics (e.g., lending devices associated with financial institutions of a threshold size, lending devices having a threshold reputation or trustworthiness, lending devices that provide a threshold level of service or interest rates, and the like). These criteria or characteristics may also identify at least one characteristic of lending services previously performed by the candidate lending devices (e.g., indications of services that are performed by the candidate devices, capabilities of the candidate devices to perform requested services, cost or timing characteristics associated with performed services, operating systems or communication protocols used by the candidate devices, quality of services provided, and/or trustworthiness of the candidate devices).

In other alternate cases, as indicated above in reference to FIG. 1, service device 214 may identify and/or recommend one or more approved, or preferred, lending devices to user device 220A. In these cases, rating unit 229A may send a request or query to recommendation unit 221 of service device 214 for the identifiers of one or more approved or preferred lending devices that are associated with a requested service. Based on certain factors (e.g., the identifier of user device 220A, the type of requested service, the association or affiliation of one or more of lending devices 202 with service device 214), recommendation unit 221 may, responsive to the sending of the query by rating unit 229A, determine the identifiers of one or more of lending devices 202 that service device 214 approves or prefers for the requested service. In some cases, recommendation unit 221 may make this determination directly. In other cases, recommendation unit 221 may make this determination indirectly (e.g., via interaction with central trusted authority system 212, such as, for example, with rating unit 213). The use of the one or more identified lending devices 202 may streamline the lending process by increasing the possibility, or even ensure, that service device 214 will accept the tokens that are generated by the one or more identified lending devices.

In those examples in which rating unit 229A sends a request for candidate lending devices to rating unit 213 of central trusted authority system 212, rating unit 213 may access central registry 215 of central authority system 212 to determine the identifiers of any candidate lending devices 202 that may satisfy the request (e.g. lending device 202A and/or 202L), and may provide these identifiers, along with any rating information from central registry 215 that is associated with these corresponding candidate lending devices, back to rating unit 229A of user device 220A. In addition, in some cases, and as described above, rating unit 213 may also provide the identifiers of any other user devices 220 (e.g., users device 220M and 220N) that have previously interacted with these candidate lending devices, such that rating unit 229A may send queries to the rating units 229 of these other user devices 220 to obtain real-time rating information associated with the candidate lending devices. Central authority system 212 may store the identifiers of candidate lending devices 202 and user devices 220 in its central registry 215.

For example, if rating unit 229A receives the identifiers of candidate lending devices 202A and 202L, and also receives the identifiers of user devices 220M (not shown) and 220N from rating unit 213 of central authority system 212, rating unit 229A may send individual queries to user devices 220M and 220N (e.g., to respective rating units 229M, 220N of these devices) to obtain any real-time rating information associated with candidate lending devices 202A and/or 202L, based on previous similar transactions that user devices 229M and/or 229N may have performed with candidate lending devices 202A and/or 202L. The rating requests may be customized to gather ratings focused on specific, relevant factors or characteristics (e.g., factors/characteristics focused on the cost/quality/timeliness/interest rates of the service performed or on the trustworthiness of candidate lending devices 202A and/or 202L). The real-time rating information provided by user devices 220M and/or 220N may include information for one or more of these factors or characteristics, in conjunction with the unique identifier of the corresponding candidate device (e.g., identifier of candidate lending device 202A or 202L) for which the respective real-time rating information pertains. In some cases, user device 220A may store this real-time rating information within its own local user device registry 226A, which may include device profiles for candidate lending devices 202A, 202L.

Whether user device 220A receives real-time rating information from other ones of user devices 220 or central authority system 212, user device 220A may then use the received real-time performance information associated with candidate lending devices 202A and 202L to select one of these lending devices to initiate performance of a desired loan request. For example, rating unit 229A may select one of candidate devices 202A or 202L based on the real-time rating information associated with these devices, and then loan request unit 224A of user device 220A may send the real-time loan request to the selected device. In doing so, rating unit 229A may determine whether the rating information associated with the candidate devices satisfies a rating threshold, such as a predefined or dynamically determined threshold that is based on one or more factors (e.g., factors focused on the cost/quality/timeliness/interest rate of the loan services performed or on the trustworthiness of candidate devices 202A and/or 202L). In some cases, the rating threshold may comprise a weighted threshold that is based on multiple different factors, where each factor has a particular weighted contribution to the overall weighted threshold. The weighting values associated with each factor may be predefined values or may be dynamically determined values that may change over time.

In some examples, rating unit 229A may select the candidate lending device based on a respective composite rating that is calculated for each of candidate devices 202A and 202L. Rating unit 229A may calculate these composite (e.g., mean average) rating based on the received real-time rating information for candidate devices 202A and 202L that is received from user devices 220M and 220N. Rating unit 229A may then use the composite ratings to select one candidate devices 202A or 202L to perform the loan transaction. For example, rating unit 229A may select the candidate device having the highest overall composite rating that satisfies a rating threshold (e.g., a predefined or dynamically determined threshold determined on one or more factors, such as described above). If, for instance, lending device 202A has the overall highest composite rating that satisfies a defined rating threshold, rating unit 229A may select lending device 202A, and loan request unit 224A may then send the real-time loan request to lending device 202A. In cases where lending device 202A requests loans from multiple lending devices (e.g., when a first lending device approves a loan amount that is less than the amount requested or needed by user device 220A), user device 220A may send multiple real-time loan requests to different lending devices 202 based, e.g., on ranked order of the ratings associated with these lending devices 202.

In some examples, the requesting machine, such as user device 220A, may gather a relatively small number of real-time ratings for a relatively small number of candidate lending devices with which to perform a transaction. In these examples, the requesting machine may calculate the composite rating as an average (e.g., mean) rating of the received real-time ratings for each of the candidate devices, and rating unit 229A may select the one of the candidate lending devices (e.g., candidate device 202A) that has the highest average rating and that satisfied a rating threshold.

In other examples, the requesting device may gather a relatively large number of real-time ratings for a relatively large number of candidate devices with which to perform the transaction. In these examples, the requesting user device may include a machine learning engine, such as an artificial intelligence (AI) or deep learning engine, which is capable of analyzing a large number of real-time ratings for candidate devices to select the optimum candidate device for the requesting user device to use when performing the transaction.

Similar to user devices 220, lending devices 202 also each may include a respective rating unit. For example, lending device 202A includes rating unit 211A, while lending device 202L includes rating unit 211L. These rating units may determine and/or receive rating information associated with one or more of user devices 220.

For example, if loan processing unit 206A of lending device 202A receives a loan request from loan request unit 224A of user device 220A, rating unit 211A of lending device 202A may determine a rating of user device 220A. In some cases, rating unit 211A may access its lending device registry 208A to obtain rating and/or credit score information associated with user device 220A. In some cases, rating unit 211 may send a request to rating unit 213 of central authority system 212 to receive rating and/or credit score information associated with user device 220A. In these cases, rating unit 213 may access its central registry 215 to obtain previously captured rating and/or credit score information for user device 220A.

However, in certain other examples, similar to the mechanism described above for user devices 220 requesting identification from central authority system 212 of user devices 220 that have interacted with a candidate lending device, lending device 202A may send a request to central authority system 212 to request identification of other lending devices 202 that have previously interacted with user device 220A (e.g., in prior loan transactions).

For instance, after loan processing unit 206A of lending device 202A has received a loan request from loan request unit 224A of user device 220A, rating unit 211A of lending device 202A may send a rating request to rating unit 213 of central authority system 212 to obtain rating information and/or lending device information of other lending devices 202 that have previously interacted with user device 220A. The request may specify certain criteria or desired characteristics (e.g., user devices with a threshold reputation or trustworthiness level, cost or timing characteristics associated with loan repayment, operating systems or communication protocols used by the user devices).

Rating unit 213 of central authority system 212 may provide requested rating information associated with user device 220A, stored in its central registry 215, back to rating unit 211A of lending device 202A. Alternatively or additionally, rating unit 213 of central authority system 212 may also access its central registry 215 to identify any other lending devices that have previously interacted with user device 220A (e.g., previously provided loans to user device 220A), and may send the identifiers of these lending devices 202 back to rating unit 211A of lending device 202A.

Similar to the functionality described above with reference to user device 220A receiving identifiers of other user devices 220 with which to check for rating information, lending device 202A may use its rating unit 211A to similarly receive the identifiers of other lending devices 202 that have previously interacted with user device 220A. Rating unit 211A may then send rating requests to the respective rating units of the other identified lending devices 202 to receive the requested rating information for user device 220A. Rating unit 211A may then calculate a composite score of the received rating information for user device 220A.

Based on the score, rating unit 211A may determine whether to provide a loan to user device 220A and, if so, the terms of the loan (e.g., amount of loan, duration of loan period, interest rate). In some cases, loan processing unit 206A may approve a loan for an amount of funds that equals or matches the specific amount of funds requested by loan request unit 224A. However, in certain cases (e.g., based upon the rating and/or credit score of user device 20A), loan processing unit 206A may approve a loan for an amount of funds that is less than the specific amount of funds requested by loan request unit 224A. In these cases, as described above, loan request unit 224A may determine to request one or more additional loans from at least one other of lending devices 202.

Upon determining to provide a loan, token generator 204A may generate a corresponding token that specifies usage restrictions that are associated with the amount of approved funds, duration of the loan, payee (e.g., payee associated with service device 214), interest rate, and/or purpose of the loan). Loan processing unit 206A of lending device 202A may then send the digital token to loan request unit 224A of user device 220A.

In some examples, one or more of user devices 220 may comprise a device chain, or chain of devices. In these examples, a user device (e.g., a mobile phone) may include or be associated with one or more other user devices (e.g., an automobile), and this group of user devices may comprise a device chain. The real-time rating information may be associated with all of the user devices in the device chain, where each individual candidate device has its own unique identifier. In some cases, the rating information may include information (e.g., credit score data) associated with one or more human beings that are associated with individual devices included in the device chain, or associated with the device chain in general.

For instances in which device chains are used, central authority system 212 may send lending devices 202 the identifiers of each user device in the chain, and/or an indication that a group of devices are associated with a particular device chain (e.g., through the use of a chain identifier or other indication or relationship). For example, continuing with the most recent example above, where user device 220A has sent a loan request to lending device 202A, lending device 202A may request real-time rating information for user device 220A from other lending devices 202 identified by central authority system. However, when requesting this rating information, lending device 202A may then specify the identifiers of each user device in the chain, and/or the indication of the group of devices being associated with the same device chain (e.g., a chain that includes a mobile computing device situation inside a vehicle and also an infotainment head unit/computing system that is directly attached to the vehicle). Lending device 202A may then receive, using rating unit 211A, real-time rating information that is associated with the collective group of candidate devices in this device chain. Rating unit 211A may then determine a composite score based on the rating information and/or credit score information associated with the devices in the chain, and then determine, based on this score, whether or not to authorize a loan for user device 220A, which is part of the overall device chain. For example, if user device 220A is a mobile phone, loan processing unit 206A may only approve a loan for user device 220A if it is part of a device chain that includes a head/computing system (e.g., another one of user devices 220) that is attached to a specific vehicle. In this example, loan processing unit 206A may determine whether or not to approve loan requests from user devices 220 based on the device chain associated with these devices. In some cases, if rating or credit score information is not available for individual devices in a chain, and/or for the chain collectively, rating unit 211A may request rating or credit score information for one or more human beings that are associated with individual devices included in the device chain, or associated with the device chain in general. Loan processing unit 206A may then determine whether or not to approve loan requests from user devices 220 based on the device chain associated with the devices and the rating or credit score information associated with individual devices in the chain, individual human beings associated with devices or the chain, and/or the chain collectively.

In various cases, a registry (e.g., central registry 215 of central authority system 212) may store device chain information and/or associations between devices. For example, central registry 215 may include the identification data of individual user devices, as well as identification or association data that associated groups of user devices together into collective device chains (e.g., using device chain identifiers or other association identifiers). The rating data included in central registry 215 may also include collective rating information that is associated with chains or groups of devices. In some cases, the rating data may include rating information associated with one or more human beings that are associated with individual devices included in the device chain, or associated with the device chain in general. The rating information may include credit score information associated with individual devices in the chain, individual human beings associated with devices or the chain, and/or the chain collectively.

As described previously, user devices 220 and/or lending devices 202 may send digital tokens to service device 214, which are redeemable by service device 214, or a payee associated with service device 214, for a specific amount of funds in exchange for one or more services provided by service device 214. (Service device 214 is just one example of any number of service devices, such as service devices 114 in FIG. 1, that may provide services to user devices 220.) A digital token may have certain usage restrictions associated with the specific amount of funds, duration of the loan, payee, service information indicating the purpose of the loan, interest rate, and the like. In some cases, the restrictions on any given digital token may be fixed such that the token is only be redeemed for the specific amount within the specific time period and by the specific payee.

In other cases, the restrictions on the token may be modifiable as directed by the specific payee (e.g., payee of service device 214). For example, the token may be generated as, or may represent, a smart contract between user device 220A, lending device 202A, and service device 202A. Once the token is transmitted to service device 214 identified in the smart contract, the restrictions specified in the original smart contract represented by the token are fulfilled, and the token becomes transferrable by service device 214. In this way, instead of immediately redeeming the token for the specific amount from the financial institution associated with lending device 202A, the payee associated with service device 214 may keep the token for later use (e.g., stored in its service device registry 218). At a particular point, service device 214 may request modification of the terms associated with a smart contract represented by the token by lending device 202A to allow the token to be transferrable to another party within another time period. In some examples, the financial institution may pay interest on the token during the time the payee holds the token. Service device 214 includes a token request unit 219 that may be configured to request such modification of the terms of the smart contract represented by the token to token modification unit 209A of lending device 202A.

Upon receiving this request, token modification unit 209A may modify the terms or restrictions specified by the token and/or the smart contract represented by the token, and may store these updates to the smart contract and/or token in lending device registry 208A. Token modification unit 209A may send an indication of the modification to the smart contact and/or token to token request unit 219. In some cases, if the token itself is modified, token modification unit 209A may send the modified token to token request unit 219 of service device 214. Upon receiving an indication of the modification to the smart contract and/or token, service device 214 may be enabled to transfer the token to another entity within system 200, including any other service device that may be part of system 200.

FIG. 3 is a block diagram illustrating further example details of a registry, such as one or more of the registries shown in FIG. 1 and/or FIG. 2, in accordance with techniques of this disclosure. FIG. 3 shows an example registry 340. Registry 340 may be one example of user device registry 126A, user device registry 126N, service device registry 118A, service device registry 118M, lending device registry 108A, lending device registry 108L, and/or a central registry (not shown) included in central authority system 112 of FIG. 1. Registry 340 may also be one example of user device registry 226A, user device registry 226N, service device registry 218A, service device registry 218M, lending device registry 208A, lending device registry 208L, and/or central registry of FIG. 2. For purposes of illustration below, FIG. 3 will be described in reference to the system 200 illustrated in FIG. 2.

Registry 340 of FIG. 3 includes one or more device profiles 342A-342P (collectively, "device profiles 342") and transaction information 352A-352Q (collectively, "transaction information 352"). As illustrated in FIG. 3, each of device profiles 342 includes identification data, token data, optional rating data, and optional status data. For example, device profile 342A includes identification data 346A, token data 348A, optional rating data 350A, and optional status data 351A. Similarly, device profile 342P includes identification data 346P, capability data 248P, optional rating data 350P, and optional status data 351P.

Each individual device profile within device profiles 342 may include information associated with a respective device. For instance, a first device profile (e.g., device profile 342A) may include information associated with a first device (e.g., one of user devices 220, one of lending devices 202, and/or service device 214 in FIG. 2), while a second device profile (e.g., device profile 342B) may include information associated with a second device (e.g., another one of user devices 220, one of lending devices 202, and/or service device 214 in FIG. 2).

If device profile 342A includes information for user device 220A shown in FIG. 2, identification data 346A may include a unique identifier that is assigned to user device 220A. In certain examples, this unique identifier may comprise a unique alphanumeric string, a unique binary identifier, or another form of unique tag. As described previously, in the case of a physical device, the unique identifier may, in some cases, be the device's IP or MAC address. In the case where a device is a virtual device (e.g., virtual machine), the unique identifier may be an identifier associated with or assigned by the physical device on which the virtual device is executed.

In some examples, the identifiers (e.g., identification data 346A, 346P) of all the devices, whether physical or virtual, are assigned by a central authority system (e.g., central authority system 212 of FIG. 2), which may ensure that all currently active devices have a unique identifier within device profiles 342. In addition, the central authority system may periodically refresh the identifiers to remove identifiers of devices that are no longer available and assign new identifiers to newly available machines. In this way, the central authority system manages the identification of any virtual devices (e.g., virtual machines), which may be torn down and re-instantiated over time.

Token data 348A may be any token data that is stored by or otherwise associated with the device that corresponds to device profile 342A. For example, if registry 340 is one example of lending device registry 208A of lending device 202A, device profiles 342 may comprise profiles of various ones of user devices 220. For instance, lending device 202A may include a device profile in device profiles 342 for each corresponding user device for which it has generated a digital token in response to a real-time loan request. As one example, if device profile 342A is a profile corresponding to user device 220A, token data 348A includes any digital tokens generated by token generator 204A for any loan requests received from user device 220A.

Token data may also be stored in the registries of user devices 220 and service device 214 of FIG. 2. For example, upon receiving a digital token from one of lending devices 202, user device 220A may store the digital token in its own user device registry 226A. Thus, if registry 340 is one example of user device registry 226A, device profile 342A may be associated with user device 220A itself, and token data 348A may include any digital tokens that user device 220A has received from one or more of lending devices 202. If user device 220A includes one or more device profiles 342 that correspond to other devices in system 200, user device 220A may not include token data for these other devices. In these cases, the token data (e.g., token data 348A) may be empty.

In various cases, service device 214 may store digital tokens that it has received from one or more of lending devices 202 and/or user devices 220 when processing transaction or service requests. In this case, service device 214 may store the digital tokens in its service device registry 218. For example, if registry 340 of FIG. 3 is an example of service device registry 218, service device 214 may store profile information associated with user device 220A in device profile 342A. In this example, token data 348A includes any digital tokens that are associated with user device 220A (e.g., digital tokens received from lending device 202A and/or user device 220A for services that are associated with user device 220A). In some cases, central authority system 212 may serve as a centralized repository for tokens, where registry 340 is one example of central registry 215. In these cases, device profiles 342 may include token data for various different devices (e.g., user devices 220) in system 200, where each one of device profiles 342 includes respective token data 348 for a corresponding one of user devices 220.

Rating data 350A may include rating information associated with a device (e.g., one of lending devices 202 or user devices 220), such as that described earlier in reference to FIG. 1 and/or FIG. 2, based upon feedback or rating information received by the central authority system from other devices in system 200, in view of prior transactions. For instance, if device profile 342A is associated with lending device 202A, rating data 350A may provide, e.g., indications of services that are performed by device lending 202A, capabilities of lending device 202A perform requested services, cost or timing characteristics associated with performed services, operating systems or communication protocols used by lending device 202A, quality of services provided, and/or trustworthiness of lending device 202A. In other examples, if device profile 342A is associated with user device 220A, rating data 350A may provide, e.g., indications of services that have been provided to user device 220A, cost or timing characteristics associated with payment for services requested by user device 220A, operating systems or communication protocols used by user device 220A, quality of interactions, and/or trustworthiness of user device 220A.

In certain cases, where registry 340 is an example of central registry 215 stored by central authority system 212, central authority system 212 may capture and store rating data in a centralized fashion for one or more of user devices 220 and/or lending devices 202. Central authority system 212 may use its rating unit 213 to capture rating data associated with these devices, which may be provided by other devices within system 200, and may store this rating data within device profiles 342 on a device-by-device basis (e.g., within rating data 350A for device profile 342A associated with a particular device). Central authority system 212 may then provide the rating data to any of the devices within system 200 upon request.

In some cases, registry 340 may be an example of a local registry stored on device, such as user device registry 226A of user device 220A, or lending device registry 208A of lending device 202A. In these cases, device profiles 342 may include profiles for other devices in the system. As a result, user device 220A or lending device 202A may include identification data, token data, rating data, and/or status data stored in device profiles 342 for these other devices. User device 220A or lending device 202A may send requests to any devices in the system for real-time rating information associated with particular candidate devices with which user device 220A or lending device 202A may wish to interact. Upon receiving this real-time rating information for these candidate devices, user device 220A or lending device 202A may store the information within the device profiles that correspond to these candidate devices. In addition, these devices may receive queries from other devices requested real-time rating information associated with certain candidate devices within the system. In these cases, these devices may access the corresponding rating data (e.g., rating data 350A) that correspond to the identified candidate devices, and provide this rating data back to the requesting device.

As shown in FIG. 3, each one of device profiles 342 may also include status and/or credit score data. For example, device profile 342A includes status/credit score data 351A, and device profile 342P includes status/credit score data 351P. This status data may include status and/or credit score information for each given device that is associated with a respective one of device profiles. For example, when registry 340 is an example of lending device registry 208A of lending device 202A, and when device profile 342A is associated with user device 220A, status/credit score data 351A may include status and/or credit score information associated with user device 220A. In some examples, a user device's credit score, such as the credit score of user device 220A, may be based on a credit score associated with a current owner of user device 220A or a current owner of a bank account tied to user device 220A. In other examples, user device 220A may have its own bank account and credit score that are not associated with any human. Status/credit score data 351A may also include status information associated with user device 220A or the entity tied to user device 220A (e.g., status of "gold member" or "elite status holder).

As shown in FIG. 3, registry 340 also includes transaction information. Each instance of transaction information 352A-352Q may correspond to details of a particular transaction that has occurred between certain devices in system 200 and/or with central authority system 212. This information may include specific information such as the type of transaction, metadata associated with the transaction, and any identifiers (e.g., machine identifiers) of devices that were involved in the respective transaction. For instance, as shown in FIG. 3, for a first transaction, transaction information 352A includes device identification data 354A and transaction details 356A. Device identification data 354A includes the unique identifiers of any entities (e.g., devices) that participated in the first transaction, and transaction details 356A includes transaction detail information such as the type of transaction and/or other metadata associated with the transaction.

In various examples, transaction information 352 may be stored in central registry 215 of central authority system 212. Transaction information 352 may be populated and updated based upon information collected and/or provided by central authority system 212. In various examples, central authority system 212 is capable of monitoring transactions that occur within system 200. In certain cases, central authority system 212 is configured to populate and update transaction information 352 based upon direct involvement of central authority system 212 in certain transactions that occur between devices of system 200 and/or with central authority system 212. In some cases, central authority system 212 is configured to populate and update transaction information 352 based upon transaction data it receives from one or more of the devices in system 200 (e.g., transaction data provided by one or more of devices based on transactions that occur between these devices). In certain examples, transaction information 352 may be stored in a device's local registry (e.g., user device registry 226A; service device registry 218, lending device registry 208A). In these examples, the device storing transaction information 352 may store information for transactions in which the respective device has participated.

Figure 4:
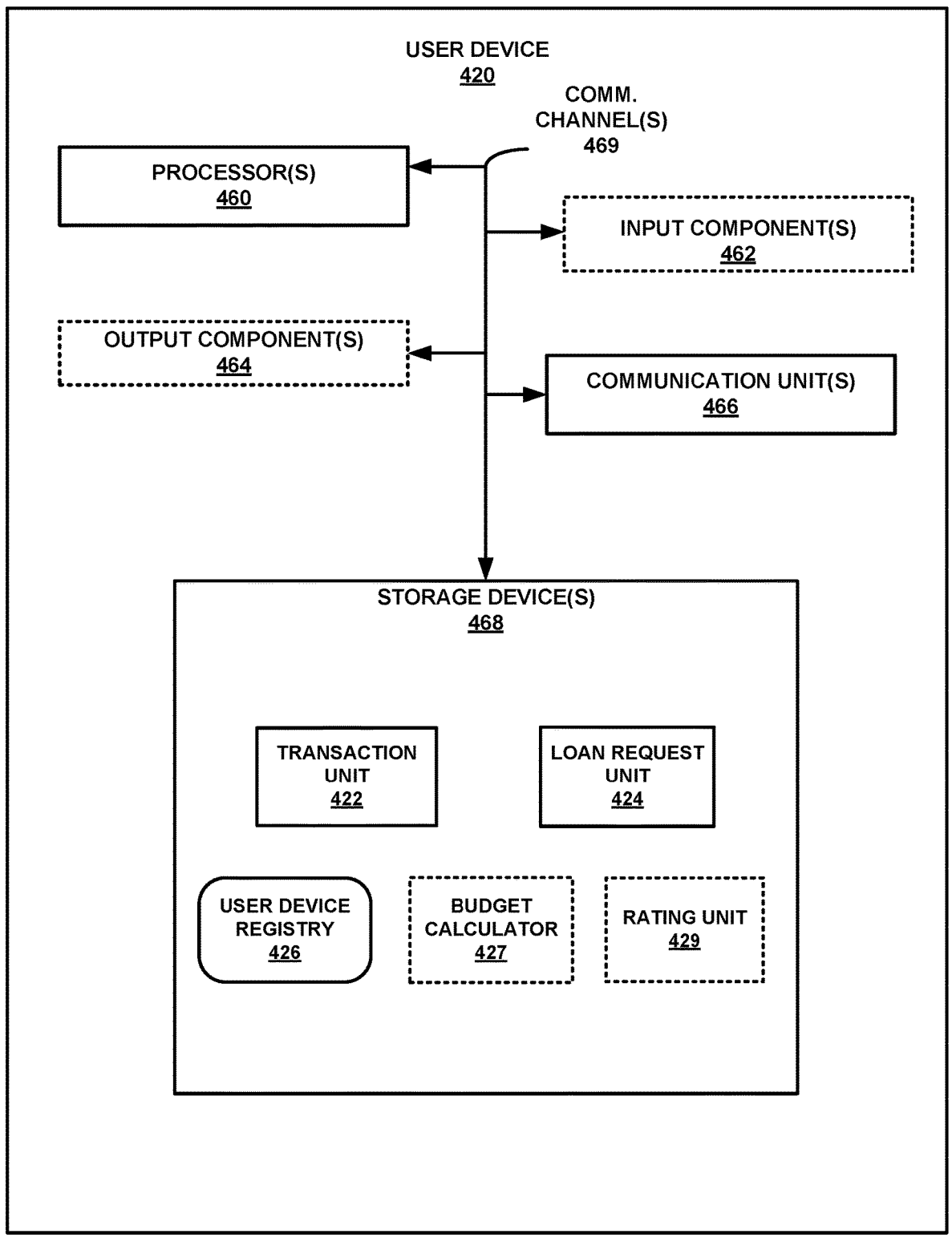
FIG. 4 is a block diagram illustrating further example details of one or more of the user devices shown in FIG. 1 and/or FIG. 2, in accordance with techniques of this disclosure.

FIG. 4 is a block diagram illustrating further example details of one or more of the user devices shown in FIG. 1 and/or FIG. 2, in accordance with techniques of this disclosure. Device 420 shown in FIG. 4 may be one example of any of the user devices 120 (FIG. 1) and/or 220 (FIG. 2). Device 420 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, device 420 may comprise one or more physical entities, while in other examples, device 420 may comprise one or more virtual entities (e.g., virtual machines). FIG. 4 illustrates only one particular example of device 420, and many other examples of device 420 may be used in other instances and may include a subset of the components included in example device 420 or may include additional components not shown in FIG. 4.

As shown in the example of FIG. 4, device 420 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of device 420 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of device 420 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of device 420 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within device 420 may store information for processing during operation of device 420 (e.g., device 420 may store data accessed by one or more modules, processes, applications, or the like during execution at device 420). In some examples, storage devices 468 on device 420 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when device 420 comprises an example of one of user devices 220 shown in FIG. 2, such as user device 220A, storage devices 468 may store instructions and/or data associated with a transaction unit 422, a loan request unit 424, a user device registry 426, an optional budget calculator 427, and an optional rating unit 429. These may be examples of similarly named components shown in FIG. 2.

Device 420 further includes one or more processors 460 that may implement functionality and/or execute instructions within device 420. For example, processors 460 may receive and execute instructions stored by storage devices 468 that execute the functionality of the elements and/or modules described herein. These instructions executed by processors 460 may cause device 420 to store information within storage devices 468 during program execution. Processors 460 may also execute instructions of the operating system to perform one or more operations described herein.

Figure 5:
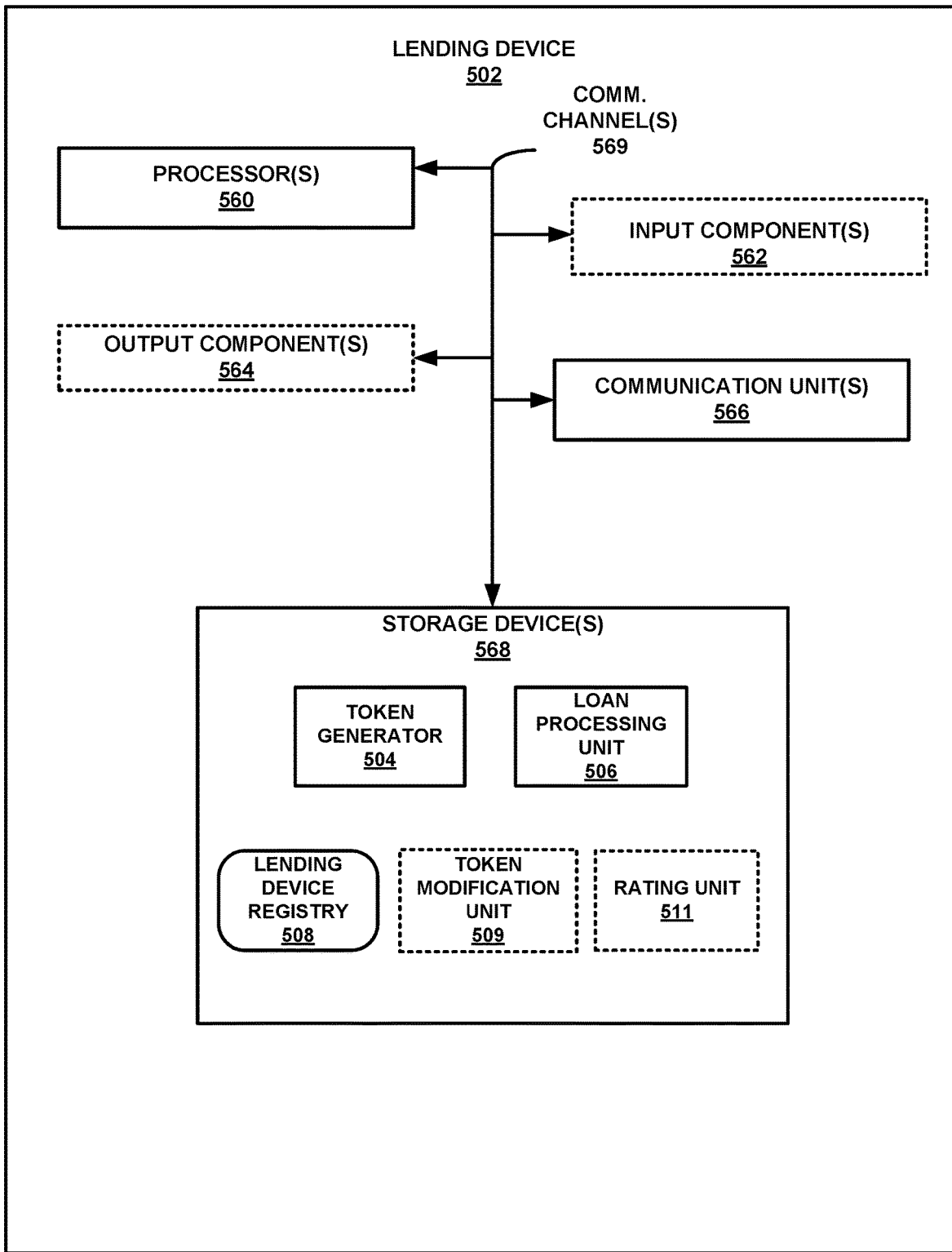
FIG. 5 is a block diagram illustrating further example details of one or more of the lending devices shown in FIG. 1 and/or FIG. 2, in accordance with techniques of this disclosure.

FIG. 5 is a block diagram illustrating further example details of one or more of the lending devices shown in FIG. 1 and/or FIG. 2, in accordance with techniques of this disclosure. Lending device 502 shown in FIG. 5 may be one example of any of lending devices 102 (FIG. 1) and/or lending devices 202 (FIG. 2). Lending device 502 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, device 502 may represent a cloud computing system, server farm, and/or server cluster (or portion thereof) that provides services to other devices or systems. In other examples, device 502 may represent or be implemented through one or more virtualized compute instances (e.g., virtual machines, containers) of a data center, cloud computing system, server farm, and/or server cluster. FIG. 5 illustrates only one particular example of device 502, and many other examples of device 502 may be used in other instances and may include a subset of, or additional components not shown, in FIG. 5.

As shown in the example of FIG. 5, device 502 includes one or more processors 560, one or more optional input components 562, one or more communication units 566, one or more optional output components 564, and one or more storage devices 568. Communication channels 569 may interconnect each of the components 560, 562, 564, 566, and 568 for inter-component communications (physically, communicatively, and/or operatively). In some examples, communication channels 569 may include a system bus, a network connection, an inter-process communication data structure, or any other method for communicating data between hardware and/or software.

One or more input components 562 of device 502 may receive input. Examples of input are tactile, audio, and video input. Examples of input components 562 include a presence-sensitive screen, touch-sensitive screen, mouse, keyboard, voice responsive system, video camera, microphone or any other type of device for detecting input from a human or machine.

One or more output components 564 of device 502 may generate output. Examples of output are tactile, audio, and video output. Examples of output components 564 include a presence-sensitive screen, sound card, video graphics adapter card, speaker, cathode ray tube (CRT) monitor, liquid crystal display (LCD), or any other type of device for generating output to a human or machine. Output components 564 may include display devices such as cathode ray tube (CRT) monitor, liquid crystal display (LCD), or any other type of device for generating tactile, audio, and/or visual output.

One or more communication units 566 of device 502 may communicate with one or more other devices via one or more networks by transmitting and/or receiving network signals on the one or more networks. Examples of communication units 566 include a network interface card (e.g. such as an Ethernet card), an optical transceiver, a radio frequency transceiver, or any other type of device that can send and/or receive information, such as through a wired or wireless network. Other examples of communication units 566 may include short wave radios, cellular data radios, wireless Ethernet network radios, as well as universal serial bus (USB) controllers.

One or more storage devices 568 within device 502 may store information for processing during operation of device 502 (e.g., device 502 may store data accessed by one or more modules, processes, applications, or the like during execution at device 502). In some examples, storage devices 568 on device 502 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 568 may include redundant array of independent disks (RAID) configurations and one or more solid-state drives (SSD's).

Storage devices 568, in some examples, also include one or more computer-readable storage media. Storage devices 568 may be configured to store larger amounts of information than volatile memory. Storage devices 568 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 568 may store program instructions and/or data associated with one or more software/firmware elements or modules.

For example, when device 502 comprises an example of one of lending device 202A shown in FIG. 2, storage devices 568 may store instructions and/or data associated with a token generator 504, a loan processing unit 506, a lending device registry 508, an optional token modification unit 509, and an optional rating unit 511. These may be examples of similarly named components shown in FIG. 1.

Device 502 further includes one or more processors 560 that may implement functionality and/or execute instructions within device 502. For example, processors 560 may receive and execute instructions stored by storage devices 568 that execute the functionality of the elements and/or modules described herein. These instructions executed by processors 560 may cause device 502 to store information within storage devices 568 during program execution. Processors 560 may also execute instructions of the operating system to perform one or more operations described herein.

Figure 6:
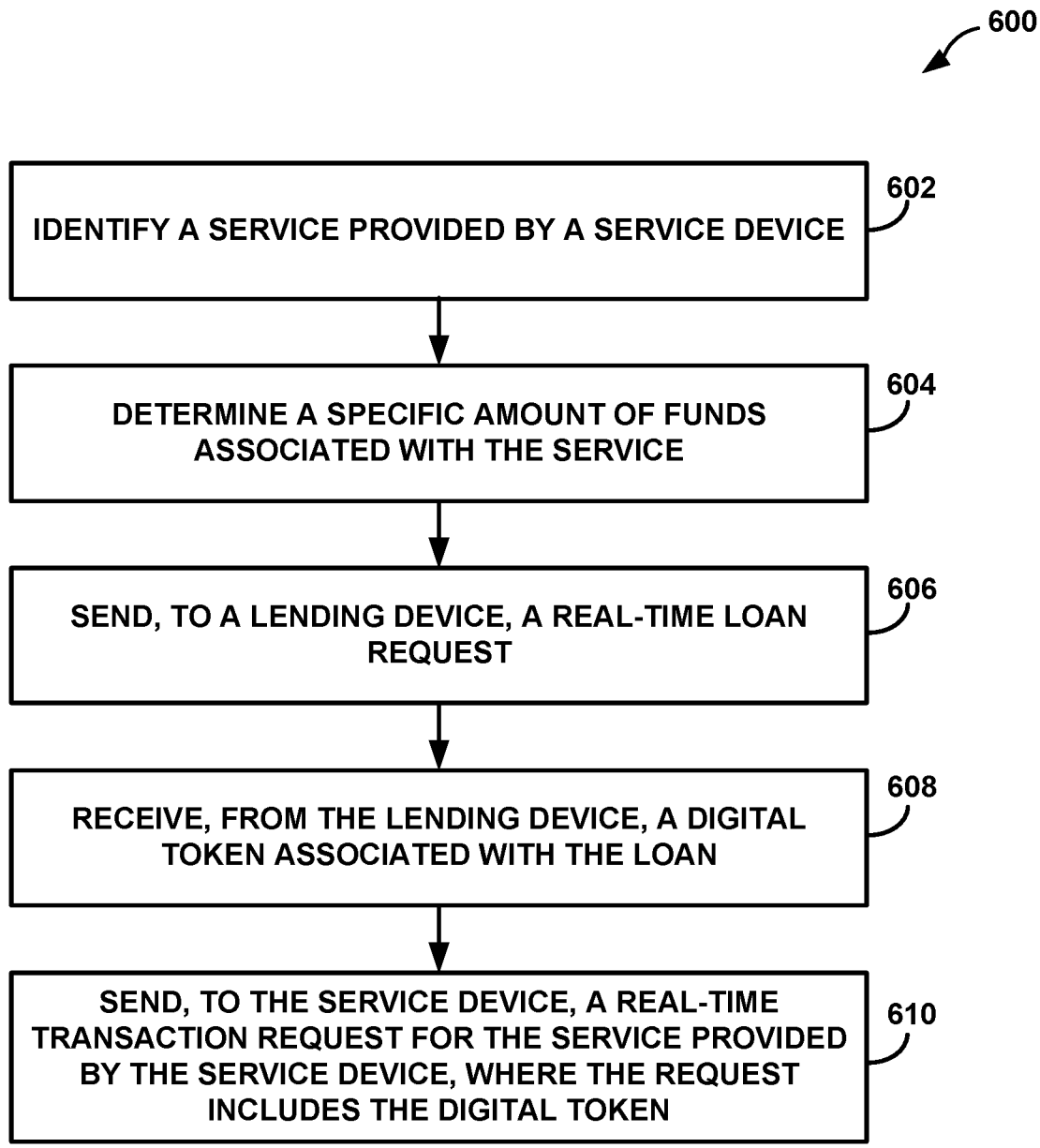
FIG. 6 is a flow diagram illustrating example operations performed by a user device to request real-time loans within a distributed lending system, in accordance with techniques of this disclosure.

FIG. 6 is a flow diagram illustrating example operations performed by a user device to request real-time loans within a distributed lending system, in accordance with techniques of this disclosure. As indicated in the example of FIG. 6, example process 600 includes operations 602, 604, 606, 608, and 610. In various examples, any of user devices 120 (FIG. 1) or user devices 220 (FIG. 2) may perform process 600. For purposes of illustration only, in the description of FIG. 6 below, it will be assumed that user device 220A performs the recited operations while interacting with lending device 202A and service device 214 in system 200.

User device 220A identifies (602) a service that is provided by service device 214. User device 220A then determines (604) a specific amount of funds that are associated with the service. User device 220A sends (606), to lending device 202A, a real-time loan request associated with a loan. The real-time loan request specifies at least an identifier of user device 220A and the specific amount of funds for the loan.

After sending the real-time loan request, user device 220A receives (608), from lending device 202A, a digital token associated with the loan. The digital token specifies usage restrictions that are associated with (i) an approved amount of funds for the loan, (ii) a duration of the loan, and (iii) a payee associated with service device 214. User device 220A sends (610), to service device 214, a real-time transaction request for the service provided by service device 214. The real-time transaction request includes the digital token associated with the loan, where the digital token is redeemable by the payee associated with service device 214 for the approved amount of funds for the loan. In various examples, user device 220A is configured to autonomously, and without user intervention, identify the service provided by service device 214, determine the specific amount of funds associated with the service, send the real-time loan request, receive the digital token associated with the loan, and/or send the real-time transaction request for the service provided by service device 214. Lending device 202A is also configured, in these examples, to perform autonomous actions when interacting with user device 220A.

Figure 7:
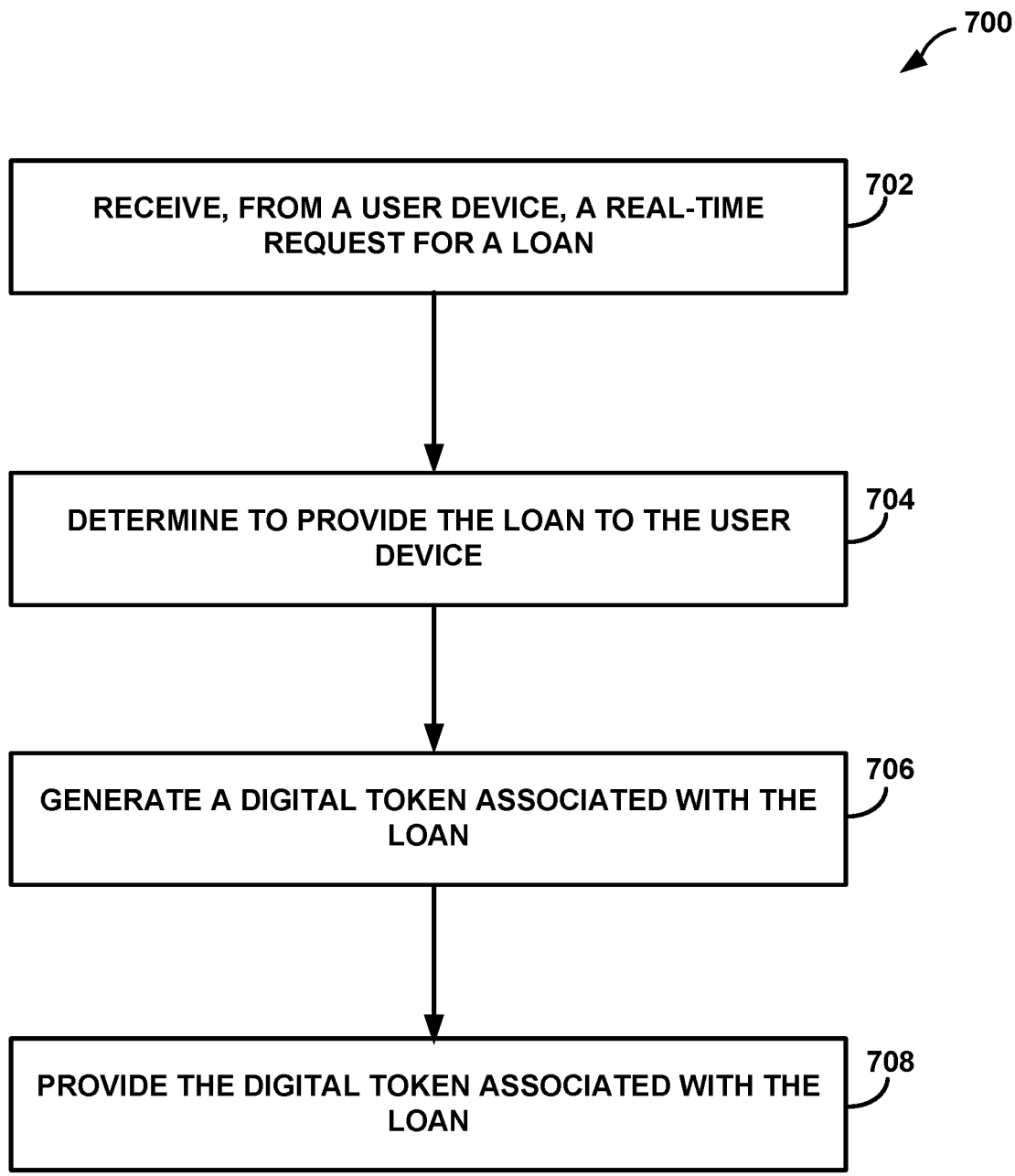
FIG. 7 is a flow diagram illustrating example operations performed by a lending device to process real-time loans within a distributed lending system, in accordance with techniques of this disclosure.

FIG. 7 is a flow diagram illustrating example operations performed by a lending device to request real-time loans within a distributed lending system, in accordance with techniques of this disclosure. As indicated in the example of FIG. 7, example process 700 includes operations 702, 704, 706, and 708. In various examples, any of lending devices 102 (FIG. 1) or lending devices 202 (FIG. 2) may perform process 700. For purposes of illustration only, in the description of FIG. 7 below, it will be assumed that lending device 202A performs the recited operations while interacting with user device 220A and service device 214 in system 200.

Lending device 202A receives (702), from user device 220A, a real-time request for a loan. The loan is associated with a service provided by service device 214. The real-time request specifies at least an identifier of user device 220A and a specific amount of funds for the loan. Lending device 202A determines (704), based at least on the specific amount of funds for the loan and on the identifier of user device 220A, whether to provide the loan to user device 220A.

Responsive to determining to provide the loan to user device 220A, lending device 202A generates (706) a digital token associated with the loan. The digital token specifies usage restrictions that are associated with (i) an approved amount of funds for the loan, (ii) a duration of the loan, and (iii) a payee associated with service device 214 that provides one or more services to user device 220A. Lending device 202A then provides (708), to at least one of user device 220A or service device 214, the digital token associated with the loan. The digital token is redeemable by the payee associated with service device 214 for the approved amount of funds for the loan. In various examples, lending device 202A is configured to autonomously, and without user intervention, receive the real-time request for the loan, determine to provide the loan to user device 220A, generate the digital token, and/or provide the digital token associated with the loan. User device 220A is also configured, in these examples, to perform autonomous actions when interacting with lending device 202A.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   identifying, by a user device, a service that is provided by a service device, wherein the service device is a smart device within a household network;
   determining, by the user device, a specific amount of funds that are associated with the service;
   sending, by the user device and to a lending device, a real-time loan request associated with a loan, wherein the real-time loan request specifies at least an identifier of the user device and the specific amount of funds for the loan;
   after sending the real-time loan request, receiving, by the user device and from the lending device, a digital token associated with the loan, wherein the digital token specifies usage restrictions that are associated with (i) an approved amount of funds for the loan, (ii) a duration of the loan, and (iii) a payee associated with the service device, and wherein the approved amount of funds for the loan from the lending device is less than the specific amount of funds specified in the real-time loan request;
   determining, by the user device based on a difference between the specific amount of funds specified in the real-time loan request and the approved amount of funds, a remaining amount of funds associated with the service;
   sending, by the user device and to a second lending device, a second real-time loan request associated with a second loan, wherein the second real-time loan request specifies at least the identifier of the user device and the remaining amount of funds for the second loan; and
   after sending the second real-time loan request, receiving, by the user device and from the second lending device, a second digital token associated with the second loan, wherein the second digital token specifies second usage restrictions that are associated with (i) an approved amount of funds for the second loan, (ii) a duration of the second loan, and (iii) the payee associated with the service device; and
   sending, by the user device and to the service device to configure the service device to provide the service, a real-time transaction request for the service provided by the service device, wherein the real-time transaction request includes the digital token associated with the loan and the second digital token associated with the second loan, and wherein the digital token is redeemable by the payee associated with the service device for the approved amount of funds for the loan, and wherein the second digital token is redeemable by the payee associated with the service device for the approved amount of funds for the second loan.

2. The method of claim 1,
   wherein the real-time loan request further specifies (a) an identifier of at least one of the service device or the payee associated with the service device, and (b) service information that indicates a purpose of the loan, and
   wherein the usage restrictions specified by the digital token are further associated with the service information.

3. The method of claim 1, further comprising:
   identifying, by the user device, a shortfall of funds between a device-managed budget and an expense associated with the service provided by the service device, wherein the shortfall of funds is associated with a specific time period,
   wherein the real-time loan request specifies the shortfall of funds as the specific amount of funds for the loan, and further specifies the specific time period associated with the shortfall of funds, and
   wherein the duration of the loan specified by the digital token is determined based on the specific time period.

4. The method of claim 1, wherein the usage restrictions specified by the digital token are further associated with an identifier of the lending device, and wherein the digital token is redeemable by the payee associated with the service device from a payor associated with the lending device for the approved amount of funds for the loan.

5. The method of claim 1, wherein the digital token represents a smart contract, and wherein the smart contract defines the usage restrictions that are associated with (i) the approved amount of funds for the loan, (ii) the duration of the loan, and (iii) the payee associated with the service device.

6. The method of claim 1, further comprising:
before sending the real-time loan request, sending, by the user device and to the service device, a query to identify at least one lending device;
responsive to sending the query, receiving, by the user device and from the service device, an identification of the lending device.

7. The method of claim 1, further comprising:
before sending the real-time loan request, sending, by the user device and to a central authority system, a query to identify at least one lending device;
responsive to sending the query, receiving, by the user device and from the central authority system, an identification of one or more candidate lending devices;
receiving, by the user device, real-time rating information associated with the one or more candidate lending devices, wherein the real-time rating information identifies at least one characteristic of lending services previously performed by the one or more candidate lending devices; and
selecting, by the user device and based on the real-time rating information, the lending device from the one or more candidate lending devices.

8. The method of claim 7, further comprising:
receiving, by the user device and from the central authority system, an identification of one or more reference devices that have previously performed at least one transaction with the one or more candidate lending devices; and
sending, by the user device and to the one or more reference devices, one or more reference queries to obtain the real-time rating information associated with the one or more candidate lending devices, wherein the one or more reference queries specify the identification of the one or more candidate lending devices, and wherein the one or more reference queries further specify the at least one characteristic of lending services previously performed by the one or more candidate lending devices,
wherein receiving the real-time rating information associated with the one or more candidate lending devices comprises, responsive to sending the one or more reference queries, receiving, by the user device and from the one or more reference devices, the real-time rating information associated with the one or more candidate lending devices.

9. The method of claim 7, wherein the one or more candidate lending devices include at least a first candidate lending device and a second candidate lending device, the method further comprising:
calculating, by the user device and based on the real-time rating information, a first score associated with the first candidate lending device;
calculating, by the user device and based on the real-time rating information, a second score associated with the second candidate lending device,
wherein selecting the lending device from the one or more candidate lending devices comprises one of:
responsive to determining that the first score is greater than or equal to the second score, selecting, by the user device, the first candidate lending device as the lending device; or
responsive to determining that the second score is greater than the first score, selecting, by the user device, the second candidate lending device as the lending device.

10. The method of claim 7, wherein the at least one characteristic of lending services previously performed by the one or more candidate lending devices includes one or more of a characteristic associated with a type of the lending services, capabilities to perform the lending services, cost or timing of the lending services, a quality of the lending services, a trustworthiness of the one or more candidate lending devices, or an operating system or communication protocol used by the one or more candidate lending devices.

11. The method of claim 1, wherein the real-time loan request further includes an identification of a device chain, wherein the device chain includes the user device and at least one additional user device, and wherein the lending device is configured to determine whether to approve the real-time loan request and generate the digital token based on the identification of the device chain.

12. The method of claim 1, wherein the user device autonomously, and without user intervention, performs one or more of identifying the service, determining the specific amount of funds, sending the real-time loan request, receiving the digital token associated with the loan, or sending the real-time transaction request for the service provided by the service device.

13. A user device comprising:
one or more processors; and
a computer-readable storage device storing instructions that are executable by the one or more processors to:
identify a service that is provided by a service device, wherein the service device is a smart device within a household network;
determine a specific amount of funds that are associated with the service;
send, to a lending device, a real-time loan request associated with a loan, wherein the real-time loan request specifies at least an identifier of the user device and the specific amount of funds for the loan;
after sending the real-time loan request, receive, from the lending device, a digital token associated with the loan, wherein the digital token specifies usage restrictions that are associated with (i) an approved amount of funds for the loan, (ii) a duration of the loan, and (iii) a payee associated with the service device, and wherein the approved amount of funds for the loan from the lending device is less than the specific amount of funds specified in the real-time loan request;
determine, based on a difference between the specific amount of funds specified in the real-time loan request and the approved amount of funds, a remaining amount of funds associated with the service;
send, to a second lending device, a second real-time loan request associated with a second loan, wherein the second real-time loan request specifies at least the identifier of the user device and the remaining amount of funds for the second loan;
after sending the second real-time loan request, receive, from the second lending device, a second digital token associated with the second loan, wherein the second digital token specifies second usage restrictions that are associated with (i) an approved amount of funds for the second loan, (ii) a duration of the second loan, and (iii) the payee associated with the service device; and send, to the service device to configure the service device to provide the service, a real-time transaction request for the service provided by the service device, wherein the real-time transaction request includes the digital token associated with the loan and the second digital token associated with the second loan, and wherein the digital token is redeemable by the payee associated with the service device for the approved amount of funds for the loan associated with the service, and wherein the second digital token is redeemable by the payee associated with the service device for the approved amount of funds for the second loan.

14. The user device of claim 13, wherein the instructions stored on the computer-readable storage device are further executable by the one or more processors to:
  identify a shortfall of funds between a device-managed budget and an expense associated with the service provided by the service device, wherein the shortfall of funds is associated with a specific time period,
  wherein the real-time loan request specifies the shortfall of funds as the specific amount of funds for the loan, and further specifies the specific time period associated with the shortfall of funds, and
  wherein the duration of the loan specified by the digital token is determined based on the specific time period.

15. The user device of claim 13, wherein the instructions stored on the computer-readable storage device are further executable by the one or more processors to:
  before sending the real-time loan request, send, to the service device, a query to identify at least one lending device;
  responsive to sending the query, receive, from the service device, an identification of the lending device.

16. The user device of claim 13, wherein the instructions stored on the computer-readable storage device are further executable by the one or more processors to:
  before sending the real-time loan request, send, to a central authority system, a query to identify at least one lending device;
  responsive to sending the query, receive, from the central authority system, an identification of one or more candidate lending devices;
  receive real-time rating information associated with the one or more candidate lending devices, wherein the real-time rating information identifies at least one characteristic of lending services previously performed by the one or more candidate lending devices; and
  select, based on the real-time rating information, the lending device from the one or more candidate lending devices.

17. The user device of claim 16, wherein the instructions stored on the computer-readable storage device are further executable by the one or more processors to:
  receive, from the central authority system, an identification of one or more reference devices that have previously performed at least one transaction with the one or more candidate lending devices; and
  send, to the one or more reference devices, one or more reference queries to obtain the real-time rating information associated with the one or more candidate lending devices, wherein the one or more reference queries specify the identification of the one or more candidate lending devices, and wherein the one or more reference queries further specify the at least one characteristic of lending services previously performed by the one or more candidate lending devices,
  wherein the instructions stored on the computer-readable storage device that are executable to receive the real-time rating information associated with the one or more candidate lending devices are further executable to, responsive to sending the one or more reference queries, receive, from the one or more reference devices, the real-time rating information associated with the one or more candidate lending devices.

18. The user device of claim 16, wherein the one or more candidate lending devices include at least a first candidate lending device and a second candidate lending device, and wherein the instructions stored on the computer-readable storage device are further executable by the one or more processors to:
  calculate, based on the real-time rating information, a first score associated with the first candidate lending device;
  calculate, based on the real-time rating information, a second score associated with the second candidate lending device,
  wherein the instructions stored on the computer-readable storage device that are executable to select the lending device from the one or more candidate lending devices are further executable to at least one of:
    responsive to determining that the first score is greater than or equal to the second score, select the first candidate lending device as the lending device; or
    responsive to determining that the second score is greater than the first score, select the second candidate lending device as the lending device.

19. A non-transitory computer-readable storage device storing instructions that, when executed, cause one or more processors of a user device to:
  identify a service that is provided by a service device, wherein the service device is a smart device within a household network;
  determine a specific amount of funds that are associated with the service;
  send, to a lending device, a real-time loan request associated with a loan, wherein the real-time loan request specifies at least an identifier of the user device and the specific amount of funds for the loan;
  after sending the real-time loan request, receive, from the lending device, a digital token associated with the loan, wherein the digital token specifies usage restrictions that are associated with (i) an approved amount of funds for the loan, (ii) a duration of the loan, and (iii) a payee associated with the service device, and wherein the approved amount of funds for the loan from the lending device is less than the specific amount of funds specified in the real-time loan request;
  determine, based on a difference between the specific amount of funds specified in the real-time loan request and the approved amount of funds, a remaining amount of funds associated with the service;
  send, to a second lending device, a second real-time loan request associated with a second loan, wherein the second real-time loan request specifies at least the identifier of the user device and the remaining amount of funds for the second loan;
  after sending the second real-time loan request, receive, from the second lending device, a second digital token associated with the second loan, wherein the second digital token specifies second usage restrictions that are associated with (i) an approved amount of funds for the second loan, (ii) a duration of the second loan, and (iii) the payee associated with the service device; and send, to the service device to configure the service device to provide the service, a real-time transaction request for the service provided by the service device, wherein the real-time transaction request includes the digital token associated with the loan and the second digital token associated with the second loan, and wherein the digital token is redeemable by the payee associated with the service device for the approved amount of funds for the loan, and wherein the second digital token is redeemable by the payee associated with the service device for the approved amount of funds for the second loan.

* * * * *